United States Patent [19]

Schmenk et al.

[11] Patent Number: 5,249,279
[45] Date of Patent: Sep. 28, 1993

[54] METHOD FOR CONTROLLING DISK ARRAY OPERATIONS BY RECEIVING LOGICAL DISK REQUESTS AND TRANSLATING THE REQUESTS TO MULTIPLE PHYSICAL DISK SPECIFIC COMMANDS

[75] Inventors: David S. Schmenk, The Woodlands; David L. Grant; Stephen M. Schultz, both of Houston; E. David Neufeld; David L. Flower, both of Tomball, all of Tex.

[73] Assignee: Compaq Computer Corporation, Houston, Tex.

[21] Appl. No.: 431,737

[22] Filed: Nov. 3, 1989

[51] Int. Cl.$^5$ .............................................. G06F 7/22
[52] U.S. Cl. .................................. 395/425; 395/275; 364/DIG. 1; 364/248.1; 364/DIG. 2; 364/968.1
[58] Field of Search ...................... 395/425, 275, 800; 371/11

[56] References Cited

U.S. PATENT DOCUMENTS

| | | | |
|---|---|---|---|
| 4,276,595 | 6/1981 | Brereton et al. | 364/200 |
| 4,612,613 | 9/1986 | Gershenson et al. | 364/200 |
| 4,773,004 | 9/1988 | Gershenson et al. | 364/200 |
| 4,805,090 | 2/1989 | Coogan | 364/200 |
| 4,811,279 | 3/1989 | Bean et al. | 364/900 |
| 4,825,403 | 4/1989 | Gershenson et al. | 364/900 |
| 4,843,544 | 6/1989 | DuLac et al. | 364/200 |
| 4,975,829 | 12/1990 | Clarey et al. | 395/275 |
| 4,989,205 | 1/1991 | Dunphy, Jr. et al. | 395/575 |
| 5,073,854 | 12/1991 | Martin et al. | 395/425 |
| 5,097,439 | 3/1992 | Patriquin et al. | 395/425 |

OTHER PUBLICATIONS

"82355 Bus Master Interface Controller (BMIC)", 1989 Intel Corporation.
Integra III Block Diagram, Pacstor, Inc., Dec., 1988.
W. Meador, "Disk Array Systems," Maximum Strategy, Inc., 1989 Reprinted by Institute of Electrical and Electronic Engineers.
Ciprico Promotion Literature, for devices disclosed in Computer Design articles.
Lieberman, "VMEbus adapter hosts SCSI-2", Computer Design, Mar. 1989, pp. 98-101.
Lieberman, "Sweep SCSI revision finally approaches standardization", Computer Design, Mar. 1989, pp. 22-25.
Lieberman, SCSI-2 controller board builds parallel disk array, Computer Design, Apr. 1989.
Robert Snively, "Intelligent host adapter directs I/O traffic, freeing up host processor", Electronic Design, Sep. 1984.
Barsky, "Intelligent Controller Trims SCSI Overhead", Electronic Design, Aug. 1989.

Primary Examiner—Robert B. Harrell
Assistant Examiner—L. Donaghue
Attorney, Agent, or Firm—Pravel, Hewitt, Kimball & Krieger

[57] ABSTRACT

A bus master interface command protocol for use with a computer system having an intelligent mass storage disk array subsystem, including a bus master and microprocessor controller. The command protocol permits the computer system to issue disk array commands to the controller at a logical level without having to issue disk specific commands. The disk array subsystem microprocessor controller reads the logical commands, translates the commands into smaller disk specific commands, and queues the disk specific commands for processing. Upon completion of the logical command, the bus master controller asserts control over the computer system bus and manages the transfer of data to or from the computer system memory. The management of the disk array subsystem and the transfer of data is effectively off-loaded from the system processor permitting more efficient use of the processor.

11 Claims, 31 Drawing Sheets

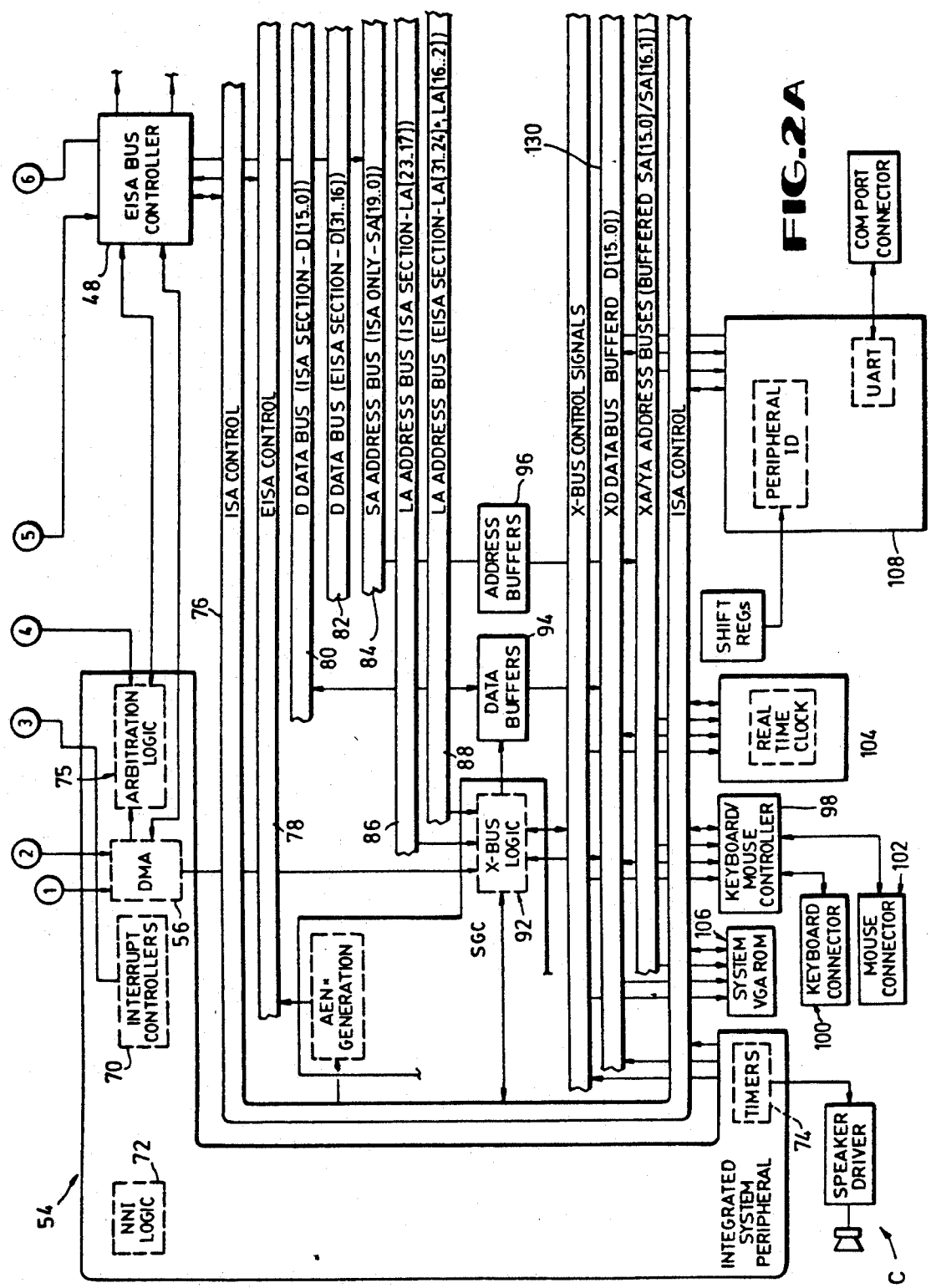

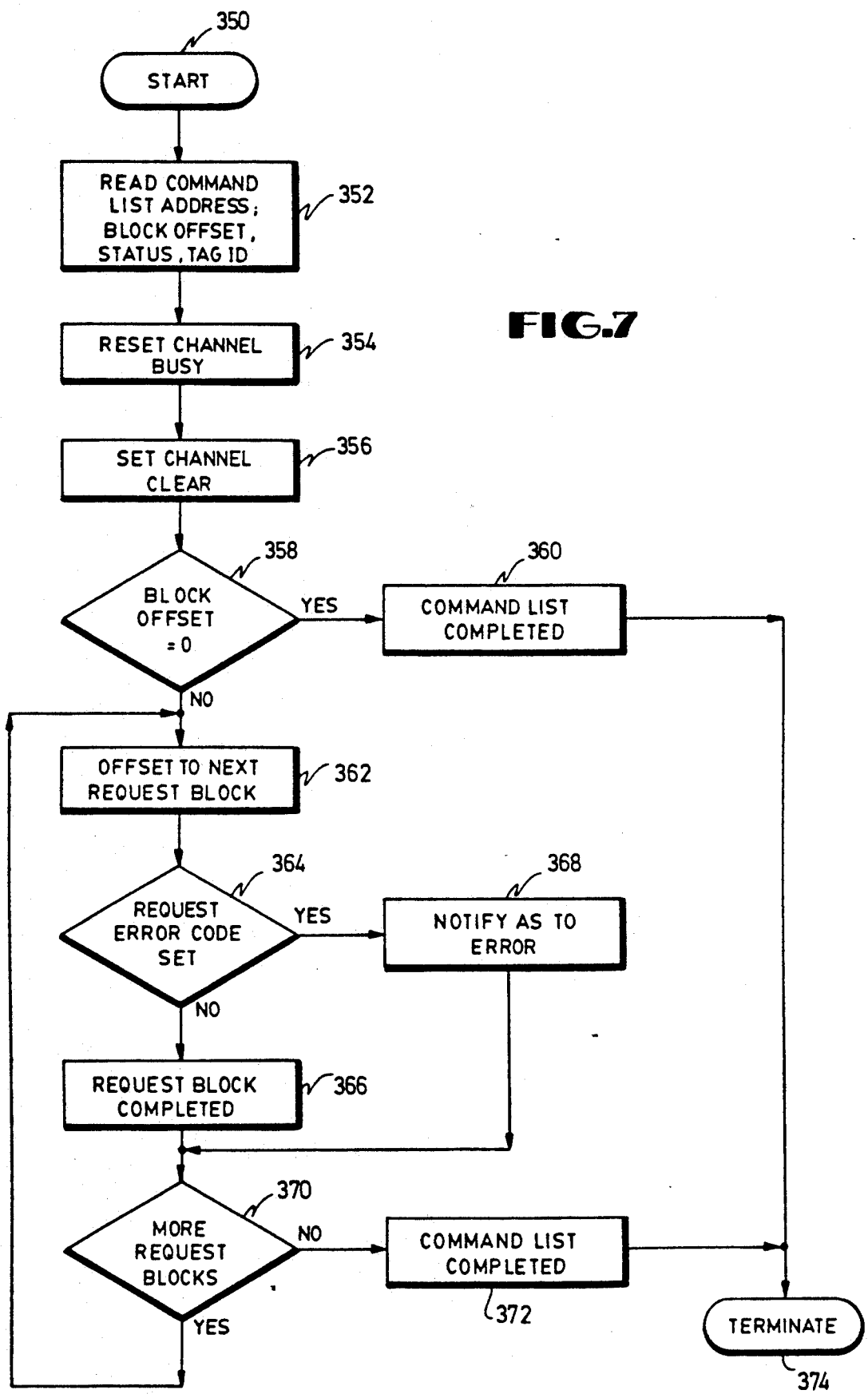

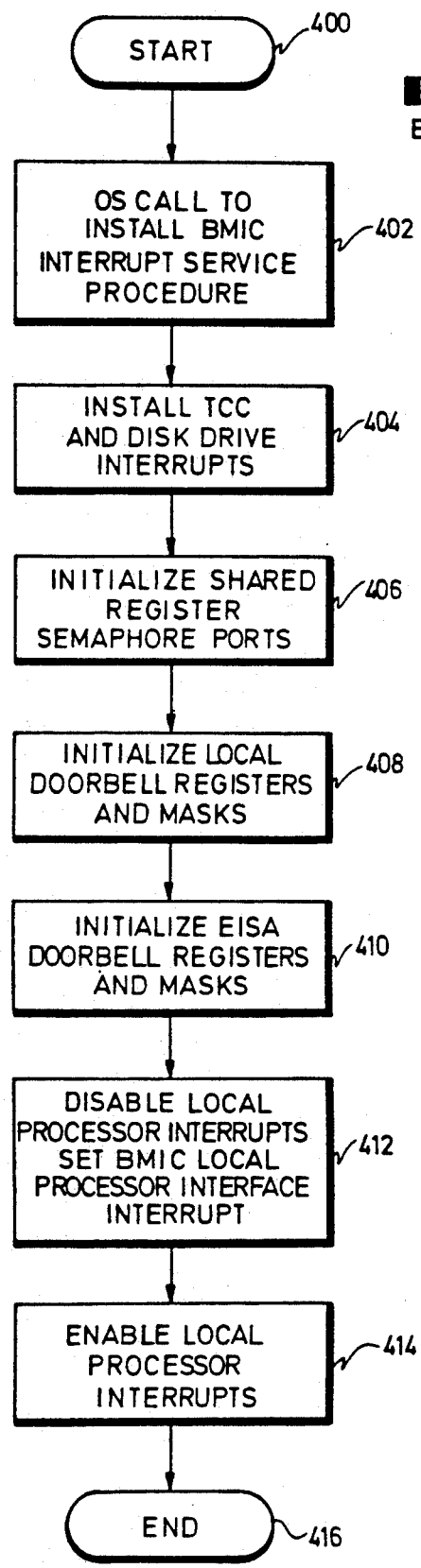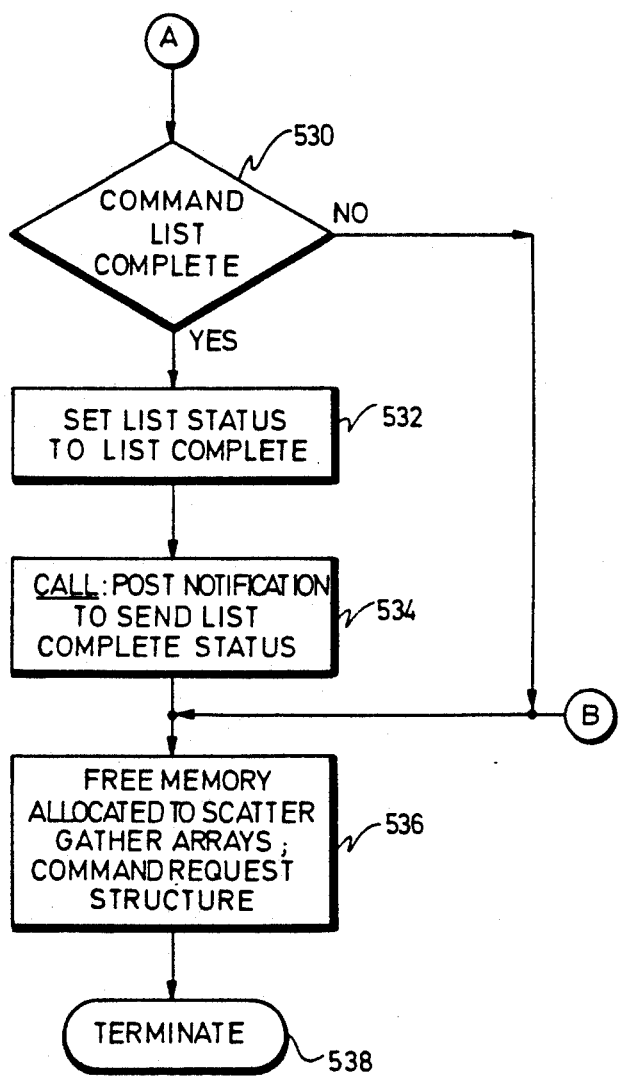

BMIC_IN

BMIC_REGS

BMIC_WRITE

SET_CONFIG

SET_CONFIG

BMIC_IDENTIFY

BMIC_TRANSFER

BMIC_TRANSFER

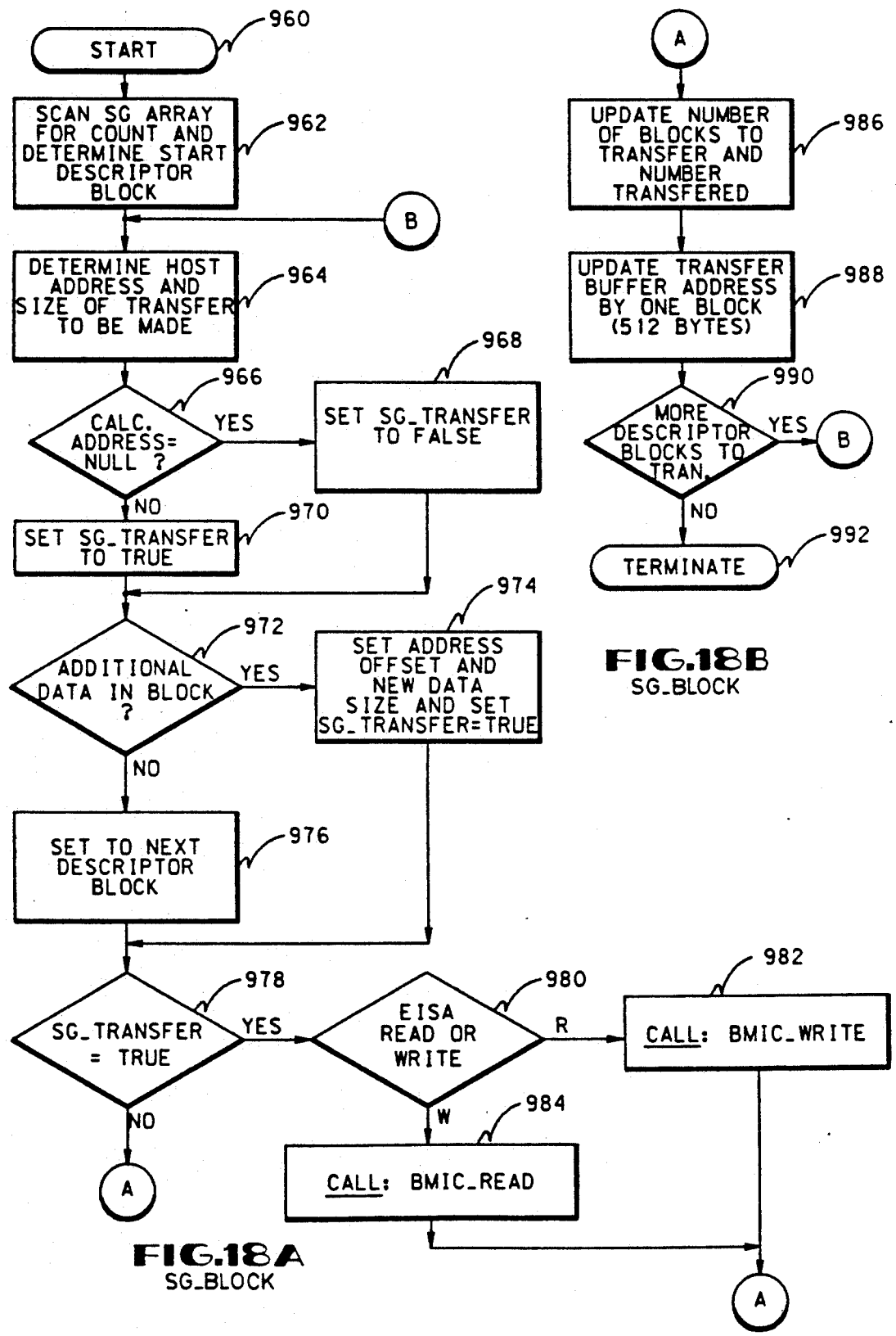
FIG.18A SG_BLOCK
FIG.18B SG_BLOCK

BMIC_XFER_QUE

PEEK

POKE

PARSE_NEW_LIST

PARSE_NEW_LIST

CONFIGURATION_VALID

POST_NOTIFICATION

NOTIFICATION_CLEAR

PARSE_NEXT_REQUEST

BMIC_SENSE_UNIT

METHOD FOR CONTROLLING DISK ARRAY OPERATIONS BY RECEIVING LOGICAL DISK REQUESTS AND TRANSLATING THE REQUESTS TO MULTIPLE PHYSICAL DISK SPECIFIC COMMANDS

BACKGROUND OF THE INVENTION

1. Field of the Invention

The present invention relates to the control of multiple disk drives within computer systems, and more particularly to command protocol and definition used to facilitate high speed data transfers for personal computer systems.

2. Description of the Prior Art

Microprocessors and the personal computers which utilize them have become more power over the recent years. Currently available personal computers have capabilities easily exceeding the mainframe computers of 20 to 30 years ago and approach the capabilities of many computers currently manufactured. Microprocessors having word sizes of 32 bits wide are now widely available, whereas in the past 8 bits was conventional and 16 bits was common.

Personal computer systems have developed over the years and new uses are being discovered daily. The uses are varied and, as a result, have different requirements for various subsystems forming a complete computer system. Because of production volume requirements and the reduced costs as volumes increase, it is desirable that as many common features as possible are combined into high volume units. This has happened in the personal computer area by developing a basic system unit which generally contains a power supply, provisions for physically mounting the various mass storage devices and a system board, which in turn incorporates a microprocessor, microprocessor related circuitry, connectors for receiving circuit boards containing other subsystems, circuitry related to interfacing the circuit boards to the microprocessor, and memory. The use of connectors and interchangeable circuit boards allows subsystems of the desired capability for each computer system to be easily incorporated into the computer system. The use of interchangeable circuit boards necessitated the development of an interface or bus standard so that the subsystems could be easily designed and problems would not result from incompatible decisions by the system unit designers and the interchangeable circuit board designers.

The use of interchangeable circuit boards and an interface standard, commonly called a bus specification because the various signals are provided to all the connectors over a bus, was incorporated into the original International Business Machines Corporations (IBM) personal computer, the IBM PC. The IBM PC utilized in Intel Corporation 8088 as the microprocessor. The 8088 has an 8 bit, or 1 byte, external data interface but operates on a 16 bit word internally. The 8088 has 20 address lines, which means that it can directly address a maximum of 1 Mbyte of memory. In addition, the memory components available for incorporation in the original IBM PC were relatively slow and expensive as compared to current components. The various subsystems such as video output units or mass storage units, were not complex and also had relatively low performance levels because of the relative simplicity of the devices available at a reasonable costs at that time.

With these various factors and the component choices made in mind, an interface standard was developed and used in the IBM PC. The standard utilized 20 address lines and 8 data lines, had individual lines to indicate input or output (I/O) space or memory space read/write operations, and had limited availability of interrupts and direct memory access (DMA) channels. The complexity of the available components did not require greater flexibility or capabilities of the interface standard to allow the necessary operations to occur. This interface standard was satisfactory for a number of years.

As is inevitable in the computer and electronics industry, capabilities of the various components available increased dramatically. Memory component prices dropped in capacities and speeds increased. Performance rate and capacities of the mass storage subsystems increased, generally by the incorporation of hard disk units for previous floppy disk units. The video processor technology improved so that high resolution color systems were reasonably affordable. These developments all pushed the capabilities of the existing IBM PC interface standard so that the numerous limitations in the interface standard became a problem. With the introduction by Intel Corporation of the 80286, IBM developed a new, more powerful personal computer called the AT. The 80286 has a 16 bit data path and 24 address lines so that it can directly address 16 Mbytes of memory. In addition, the 80286 has an increased speed of operation and can easily perform many operations which taxed 8088 performance limits.

It was desired that the existing subsystem circuit boards be capable of being used in the new AT, so the interface standard used in the PC was utilized and extended. A new interface standard was developed, which has become known as the industry standard architecture (ISA). A second connector for each location was added to contain additional lines for the signals used in the extension. These lines included additional address and data lines to allow the use of the 24 bit addressing capability and 16 bit data transfers, additional interrupt and direct memory access lines and lines to indicate whether the subsystems circuit board was capable of using the extended features. While the address values are presented by the 80286 microprocessor relatively early in the operation cycle, the PC interface standard could not utilize the initial portions of the address availability because of different timing standards for the 8088 around which the PC interface was designed. This limited the speed at which operations could occur because they were now limited to the interface standard memory timing specifications and could not operate at the rates available with the 80286. Therefore, the newly added address lines included address signals previous available, but the newly added signals were available at an early time in the cycle. This change in the address single timing allowed operations which utilized the extended portions of the architecture to operate faster.

With a higher performance components available, it became possible to have a master unit other than the system microprocessor or direct memory access controller operating the bus. However, because of the need to cooperate with circuit boards which operated under the new 16 bit standard or the old 8 bit standard, each master unit was required to understand and operate with all the possible combinations of circuit boards. This increased the complexity of the master unit and resulted in a duplication of components, because the master unit had to incorporate many of the functions and features already performed by the logic and circuitry on the system board and other master units. Additionally, the master unit was required to utilize the direct memory access controller to gain control of the bus, limiting prioritizing and the number of master units possible in a given computer system.

The capability of components continued to increase. Memory speeds and sizes increased, mass storage units and size increased, video unit resolutions increased and Intel introduced the 80386. The increased capabilities of the components created a desire for the use of bus master units, but the performance of a bus master unit was limited by the ISA specification and capabilities. The 80386 could not be fully utilized because it offered the capability to directly address 4 Gbytes of memory using 32 bits of address and could perform 32 bit wide data transfers, while the ISA standard allowed only 16 bits of data and 24 bits of address. The local area network (LAN) concept, where information and file stored on one computer called server and distributed to local work stations having limited or no mass storage capabilities, started becoming practical with the relatively low cost of high capability of components needed for adequate servers and the low costs of the components for work stations. An extension similar to that performed in developing the ISA could be implemented to utilize the 80386's capabilities. However, this type of extension would have certain disadvantages. With the advent of the LAN concept and the high performance requirements of the server and of video graphics work stations used in computer-added design and animation work, the need for a very high data transfer rates became critical. An extension similar to that performed in developing the ISA would not provide this capability, even if slightly shorter standards cycle was provided, because this would still leave the performance below desired levels.

With the increased performance of computer systems, it became apparent that mass storage subsystems, such as fixed disk drives, played an increasingly important role in the transfer data to and from the computer system. In the past few years, a new trend in this storage subsystems has emerged for improving data transfer performance, capacity and reliability. This is generally known as a disk array subsystem. One key reason for wanting to build a disk array subsystem is to create a logical device that has very high data transfer rate. This may be accomplished by "ganging" multiple standard disk drives together and transferring data to or from these drives to the system memory. If n drives are ganged together, then the effective data transferred rate is increased n times. This technique, called "striping" originated in the super computing environment where the transfer of large amounts of data to and from secondary storage is a frequent requirement. With this approach, the end physical drives would become a single logical device and may be implemented either through software or hardware.

A number of reference articles on the design and management of disk arrays have been published in recent years. These include "Some Design Issues of Disk Arrays" by Spencer Ng, April 1989 IEEE; "Disk Array Systems" by Wes E. Meador, April 1989 IEEE; and "A Case for Redundant Arrays of Inexpensive Disks (RAID)" by D. Patterson, G. Gibson and R. Catts report No. UCB/CSD 87/391, December 1987, Computer Science Division, University of California, Burkley, Calif.

SUMMARY OF THE INVENTION

The present invention is directed towards a method for an intelligent disk array controller system, permitting the controller to manage the operation of an array of up to 8 standard integrated disk drives connected in drive pairs without significant supervision by the computer system host. Further, the present invention is directed toward a communications protocol between the disk array controller and a computer system host. The controller of the present invention provides for two communications paths for commands and data through which the host may issue disk requests such as a read, write or diagnostic commands to the disk array. These communication paths are known as the compatibility interface and the bus master interface. The compatibility interface and the bus master interface operate in parallel, and may be used alternatively or concurrently to pass commands and data between the host and the disk drive array controller. The controller of the present invention is designed to further allow the host processor to be independent of the physical configuration of the array and drives which make the disk array; the data distribution technique used to spread the data among the drives in the array; drive parity operation; and most error recovery and fault tolerance activities.

The communication mechanism between the disk array and existing host driver software within the present invention is via the compatibility interface. This interface allows the operation of software that expects a hardware interface compatible with existing standard ISA hard disk register sets.

The communication mechanism between the disk array and new host driver software is through the bus master interface controller (BMIC). The controller is capable of data transfer rates across the EISA bus at a rate of 32 Mbytes per second using 32 bit bus master burst DMA (type C) cycles as defined in the EISA specification through the bus master interface controller.

The present invention is directed toward a command protocol for the implementation of this high speed disk array data transfer. In the present invention, the host issues logical commands to the disk array controller, as opposed to detailed disk information, such as disk drive number, head, cylinder and sector information. These logical requests are processed by the disk array controller which develops the detailed level information for performing functions within the disk array without placing this overhead on the system host.

BRIEF DESCRIPTION OF THE DRAWINGS

A better understanding the of the invention can be had when the following detailed description of the preferred embodiment is considered in conjunction with the following drawings, in which:

FIGS. 1, 2A and 2B are a schematic block diagrams of a computer system incorporating the present invention;

FIG. 7 is a flow diagram showing the manner in which the disk array controller notifies a host processor or device driver that the request has been completed;

FIG. 8 is a flow diagram of the manner in which the method of the present invention is initialized;

FIGS. 18A and 18B are flow diagrams of the manner in which the current invention manages logical request having multiple locations for data;

DETAILED DESCRIPTION OF THE PREFERRED EMBODIMENT

Table of Contents

I. Computer System Overview
II. Disk Array Controller
III. Bus Master Interface Controller
IV. Command Protocol and Definition
V. System Operation
  A. Overview of Command Submission
  B. Overview of Command Completion Notification
  C. Command Protocol System
    1. Initialization
    2. Local Processor Interrupt Service Procedure
    3. Logical Command Submission
    4. Command List Parse/Review
    5. Next Disk Request Review
    6. Scatter/Gather Block Transfer
    7. BMIC Data Transfer
    8. BMIC Data Transfer Queue
    9. BMIC Data Read
    10. BMIC Data Write
    11. Peek Mode Data Transfer
    12. Poke Mode Data Transfer
    13. Command Completion Notification
    14. Command Notification
    15. Command Completion Post Notification
    16. Configure Logical Unit
    17. Sense Logical Unit Configuration
    18. Sense Unit Status
    19. Identify Controller or Disk
    20. Logical Unit Configuration Check
VI. Conclusion I. Computer System Overview Referring now to FIGS. 1, 2 and 2A, the letter C designates generally a computer system incorporating the present invention. For clarity, system C is shown in two portions, with the interconnections between FIGS. 1, 2A and 2B designated by reference to the circled numbers one to eight. System C is comprised of a number of block elements interconnected via four buses. Throughout this specification, signal mnemonics with an asterisk following the signal descriptors indicates the signal is active at a logic low level. Signal mnemonics having numbers or ranges between angled brackets refer to those particular bits or positions in a bus.

Figure 1:
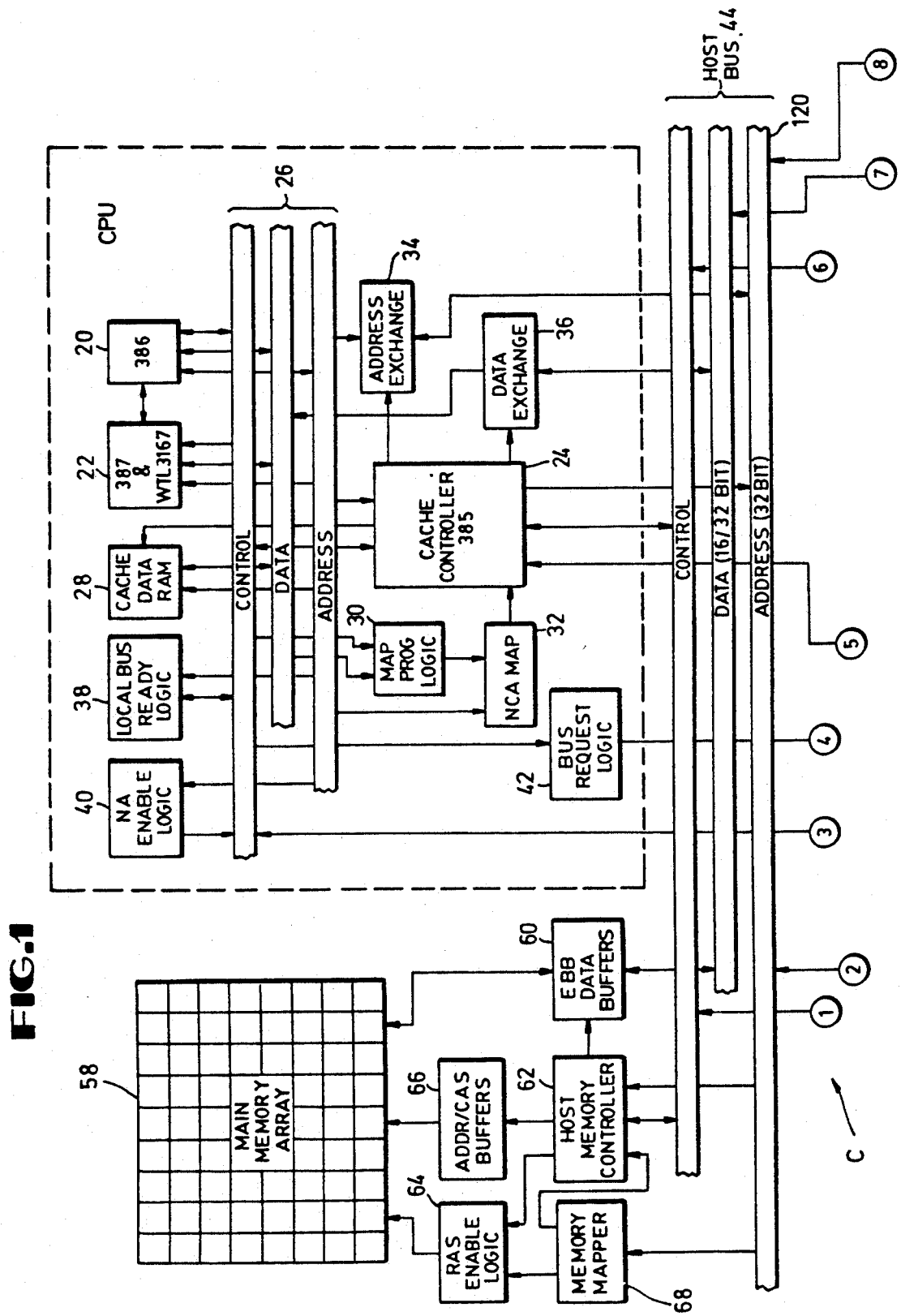

In FIG. 1, a computer system is depicted. A central processing unit CPU comprises a processor 20, a numerical coprocessor 22 and a cache memory controller 24 and associated logic circuits connected to a local processor bus 26. Associated with cache controller 24 is high speed cache data random access memory 28, noncacheable memory address map programming logic circuitry 30, noncacheable address memory 32, address exchange latch circuitry 34 and data exchange transceiver 36. Associated with the CPU also are local bus ready logic circuit 38, next address enable logic circuit 40 and bus request logic circuit 42.

The processor 20 is preferably an Intel 80386 microprocessor. The processor 20 has its control, address and data lines interfaced to the local processor bus 26. The coprocessor 22 is preferably an Intel 80387 and/or Weitek WTL 3167 numeric coprocessor interfacing with the local processor bus 26 and the processor 20 in the conventional manner. The cache ram 28 is preferably suitable high-speed static random access memory which interfaces with the address and data elements of bus 26 under control of the cache controller 24 to carry out required cache memory operations. The cache controller 24 is preferably an Intel 82385 cache controller configured to operate in two-way set associative master mode. In the preferred embodiment the components are the 33 MHz versions of the respective units. Address latch circuitry 34 and data transceiver 36 interface the cache controller 24 with the processor 20 and provide a local bus interface between the local processor bus 26 and a host bus 44.

Circuit 38 is a logic circuit which provides a bus ready signal to control access to the local bus 26 and indicate when the next cycle can begin. The enable circuit 40 is utilized to indicate that the next address of data or code to be utilized by subsystem elements in pipelined address mode can be placed on the local bus 26.

Noncacheable memory address map programmer 30 cooperates with the processor 20 and the noncacheable address memory 32 to map noncacheable memory locations. The noncacheable address memory 32 is utilized to designate areas of system memory that are noncacheable to avoid many types of cache memory incoherency. The bus request logic circuit 42 is utilized by the processor 20 and associated elements to request access to the host bus 44 in situations such as when requested data is not located in the cache memory 28 and access to system memory is required.

Figure 2B:
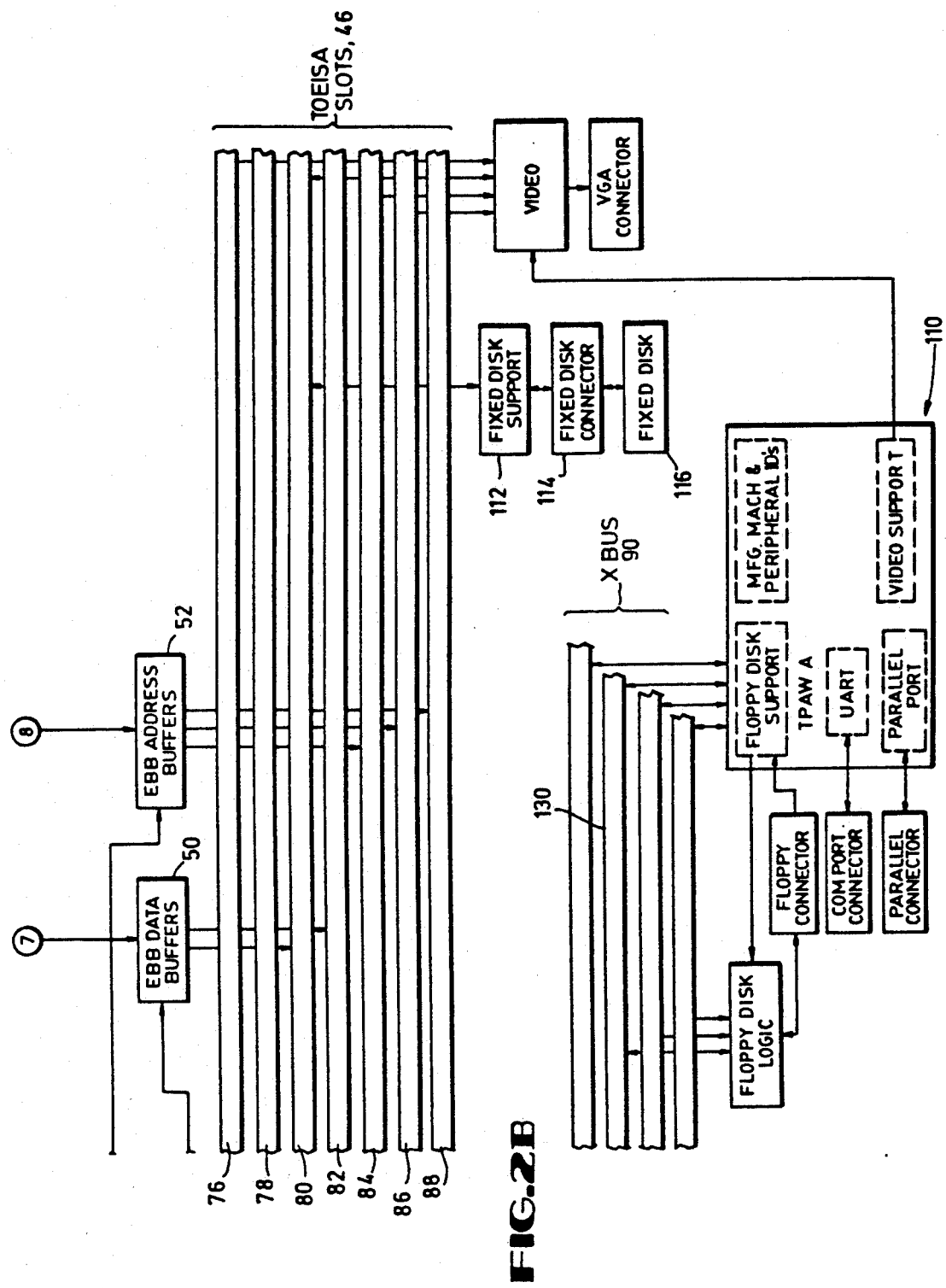

In the drawings, system C is configured having the processor bus 26, the host bus 44, an extended industry standard architecture (EISA) bus 46 (FIG. 2) and an X bus 90. The details of the portion of the system illustrated in FIGS. 2A and 2B and not discussed in detail below are not significant to the present invention other than to illustrate an example of a fully configured computer system. The EISA specification Version 3.1 is incorporated as Appendix 1 to U.S. Pat. No. 5,101,492 to Schultz et al., and is hereby incorporated by reference, explains the requirements of an EISA system. The portion of system C illustrated in 2A and 2B is essentially a configured EISA system which includes the necessary EISA bus 46, and EISA bus controller 48, data latches and transceivers 50 and address latches and buffers 52 to interface between the EISA bus 46 and the host bus 44. Also illustrated in FIGS. 2A and 2B is an integrated system peripheral 54, which incorporates a number of the elements used in an EISA-based computer system.

The integrated system peripheral (ISP) 54 includes a direct memory access controller 56 for controlling access to main memory 58 (FIG. 1) or memory contained in EISA slots and input/output (I/O) locations without the need for access to the processor 20. The main memory array 58 is considered to be local memory and comprises a memory circuit array of size suitable to accommodate the particular requirements of the system. The ISP 54 also includes interrupt controllers 70, nonmaskable interrupt logic 72 and system timers 74 which allow control of interrupt signals and generate necessary timing signals and wait states in a manner according to the EISA specification and conventional practice. In the preferred embodiment, processor generated interrupt request are controlled via dual interrupt control circuits emulating and extending conventional Intel 8259 interrupt controllers. The ISP 54 also includes bus arbitration logic 75 which, in cooperation with the bus controller 48, controls and arbitrates among the various requests for the EISA bus 46 by the cache controller 24, the DMA controller 56 and bus master devices located on the EISA bus 46.

The main memory array 58 is preferably dynamic random access memory. Memory 58 interfaces with the host bus 44 via a data buffer circuit 60, a memory controller circuit 62 and a memory mapper 68. The buffer 60 performs data transceiving and parity generating and checking functions. The memory controller 62 and memory mapper 68 interface with the memory 58 via address multiplexer and column address strobe buffers 66 and row address enable logic circuit 64.

The EISA bus 46 includes ISA and EISA control buses 76 and 78, ISA and EISA control buses 80 and 82 and address buses 84, 86 and 88. System peripherals are interfaced via the X bus 90 in combination with the ISA control bus 76 from the EISA bus 46. Control and data/address transfer for the X bus 90 are facilitated by X bus control logic 92, data transceivers 94 and address latches 96.

Attached to the X bus 90 are various peripheral devices such as keyboard/mouse controller 98 which interfaces the X bus 90 with a suitable keyboard and mouse via connectors 100 and 102, respectively. Also attached to the X bus 90 are read only memory circuits 106 which contain basic operations software for the system C and for system video operations. A serial communications port 108 is also connected to the system C via the X bus 90. Floppy and fixed disk support, a parallel port, a second serial port, and video support circuits are provided in block circuit 110.

II Disk Array Controller

Figure 3:
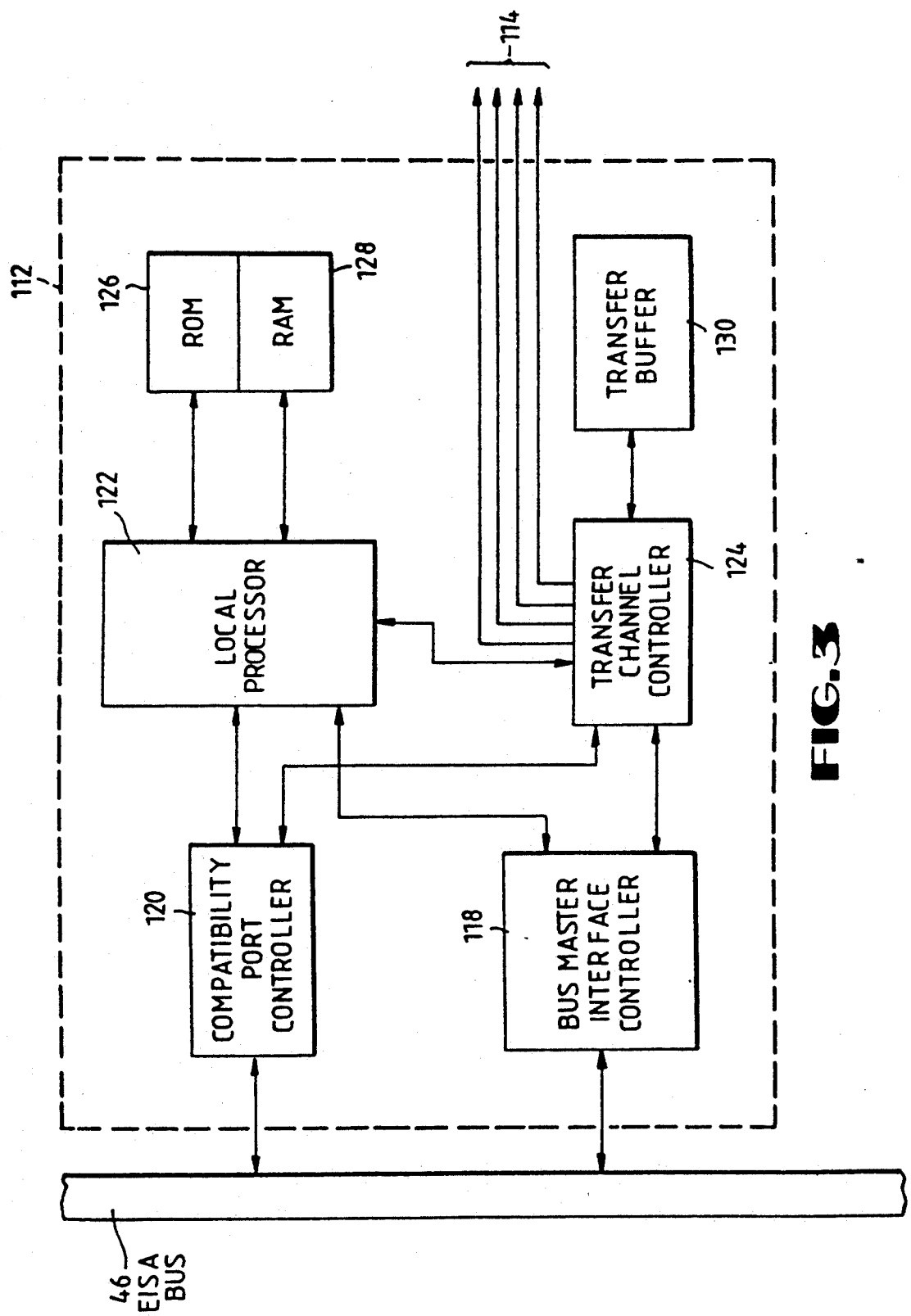
FIG. 3 is a schematic block diagram of a disk array controller incorporating the present invention.

The disk array controller 112 is connected to the EISA bus 46 to provide for the communication of data and address information through the EISA bus. Fixed disk connectors 114 are connected to the fixed disk support system and are in turn connected to a fixed disk array 116. FIG. 3 is a schematic block diagram of the disk array controller 112 incorporating the present invention. The disk array controller 112 incorporating the present invention includes a bus master interface controller 118 (BMIC), preferably an Intel Corporation 82355, which is designed for use in a 32 bit EISA bus master expansion board and provides all EISA control, address, and data signals necessary for transfers across the EISA bus. The BMIC 118 supports 16 and 32 bit burst transfers between the disk array system and system memory. Further, the BMIC is capable of converting a transfer to two 32 bit transfers if the memory to be transferred is nonburstable. Additionally, BMIC 118 provides for the transfers of varying data sizes between an expansion board and EISA and ISA devices.

The disk array controller 112 of the present invention also includes a compatibility port controller 120 (CPC). The CPC 120 is designed as a communication mechanism between the EISA bus 46 and existing host driver software not designed to take advantage of EISA capabilities.

Also included in the disk array controller 112 which incorporates the present invention is a microprocessor 122, preferably an Intel Corporation 80186 microprocessor. The local processor 122 has its control, address and data lines interfaced to the BMIC 118, CPC 120, and transfer channel controller 124. Further, the local processor 122 is also interfaced to local read only memory (ROM) 126 and dynamic random access memory (RAM) 128 located within the disk array controller 112.

The transfer channel controller 124 (TCC) controls the operation of four major DMA channels that access a static RAM transfer buffer 130. The TCC 124 assigns DMA channels to the BMIC 118, the CPC 120 the local processor 122 and to the disk array DMA channel 114. The TCC 124 receives requests from the four channels and assigns each channel a priority level. The local processor 122 has the highest priority level. The CPC 120 channel has the second highest priority level. The BMIC 118 channel has the third highest priority level and the disk array DMA channel 114 has the lowest priority level.

The disk array DMA channel 114 is shared by four disk drives subchannels. The four disk drive subchannels may be assigned to any one of eight different disk drives residing in the disk array. The four drive subchannels have equal priority within the disk array DMA channel. The subchannels are rotated equally to become the source for the disk array DMA channel. One of the subchannels is inserted in rotation only if it has an active DMA request. The remaining three subchannels are always active in the rotation.

In the present invention a request is submitted to the disk array controller 112 through the BMIC 118. The local processor 122 on receiving this request through the BMIC 118 builds a data structure in local processor RAM memory 128. This data structure is also known as a command list and may be a simple read or write request directed to the disk array, or it may be a more elaborate set of request containing multiple read/write or diagnostic and configuration requests. The command list is then submitted to the local processor 122 for processing according to the method of the present invention.

The local process 122 first translates the command list or "logical command" into a series of smaller command requests, described hereinafter in FIG. 5. These command requests may include disk I/O operations or other diagnostic functions. Where the command requests are non-I/O operations, the local processor places them in a queue for execution. Where the command requests are directed toward I/O functions, the local processor performs a second set of translations to generate drive requests which include specific disk parameters such as head, cylinder and sector information related to the source or target address for any transfer.

The drive requests are also placed in queue for execution. The local processor 122 will select the first command in queue for execution. The local processor 122 will process the command in conjunction with the TCC 124 to manage transfer of data into or out of the disk array into a transfer buffer. The local processor 122 will then load the BMIC 118 registers with transfer information and the BMIC 118 will manage the transfer between the host and disk array.

Once the execution of the command list is complete, the local processor 122 notifies the operating system device driver. The submission of the command list and the notification of a command list completion are achieved by a protocol which uses the BMIC 118 I/O registers. To allow multiple outstanding requests to the disk array controller 112, these I/O registers are divided into two channels: a command list submit channel and a command list complete channel.

III. Bus Master Interface Controller

Figure 4:
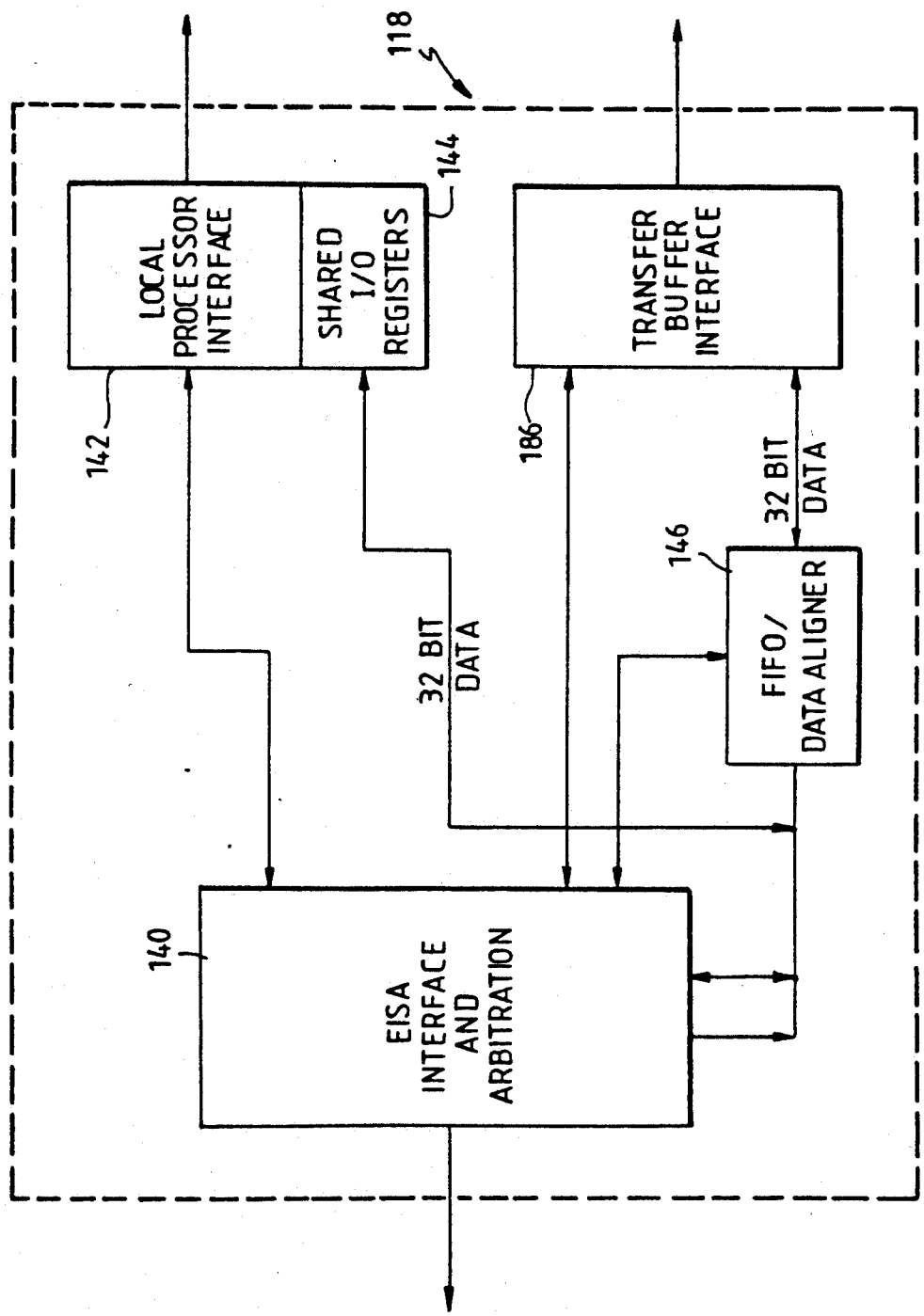
FIG. 4 is a schematic block diagram of a bus master interface controller incorporating the present invention.

FIG. 4 is a schematic block diagram of BMIC 118. What follows is a brief discussion of the functions and features of the BMIC 118.

In EISA slave mode, the BMIC 118 monitors the EISA bus 46 address lines for general I/O address decoding, slot-specific address decoding, and shared register 144 accessing. During slave mode operations, all BMIC 118 internal registers are accessible through the local processor interface 142, and all shared registers 144 are accessible to the EISA bus 46 or local processor 122 through the EISA interface 140 or the local processor interface 142 respectively.

In EISA master mode, the BMIC 118 becomes the master of the EISA bus 46. It may perform bursts, nonburst, mismatched or peek/poke data transfers. During master mode operations, all internal registers of the BMIC 118 are accessible to the local processor 122 (FIG. 3) through the local processor interface 142 of the BMIC 118. The arbiter portion of the EISA interface 140 determines which mode the BMIC 118 is in; performs EISA arbitration; and provides the control signal necessary to regulate the slave and master activities internal to the BMIC 118. In slave mode, the arbiter portion of the EISA interface 140 also mediates between the EISA side and the local side during shared register 144 accesses.

|  | Shared Reg. Accessing | Local CPU Only Reg. Accessing | EISA I/O Address Decoding | Data Transfers |
| --- | --- | --- | --- | --- |
| EISA Slave Mode | YES | YES | YES | NO |
| EISA Master Mode | YES | YES | NO | YES |

The EISA interface and arbiter 140 contains two identical independent transfer channels are configurable to run either burst or nonburst cycles to and from system memory 58 (FIG. 1). The BMIC 118 will automatically run nonburst or mismatched cycles if the memory addressed by the BMIC 118 cannot run burst cycles. Mismatched cycles will be run if data size translation is required from 32 bit to 16 bit or 8 bit.

Each transfer channel has three sets of registers to regulate data transfers. These are the base register group, the current register group, and the data status/control register group. This implementation of a triple register set allows the local processor 122 to program the next transfer on the channel while the current transfer is being executed.

The base register contains seven 8-bit registers. These registers are programmed by the local processor 122 when a transfer is required across one of the channels. Four transfer channel base address registers are combined to form the starting 32-bit EISA address to be used during the transfer The remaining three registers are the transfer channel base count registers. The base count registers are utilized to determine the number of transfers to be performed. The number of bits which can be transferred ranges from 1 bit to 4 Gbytes. The most significant bit of the transfer channel base count register is used to control the start of the transfer and the second most significant bit is used to control the direction of the transfer.

The current register set contains seven registers, each of which correspond to a base register. These registers are loaded from the base registers. The transfer channel current address registers contain the 32 bit real-time EISA memory addresses. The transfer channel current count registers contain the number of bits remaining to be transferred on the channel. The current register set may be read by the local processor 122 (FIG. 3) through the local processor interface 142. The status/control register set contains three registers: the transfer channel strobe register, the transfer channel configuration register and the transfer channel status register. The transfer channel strobe register is used to initiate the transfer of data from the base register set associated current register. A transfer request for the channel will be generated following the current register load. The transfer channel configuration register is used to program the mode of the transfer. The transfer channel status register provides current FIFO 146 and transfer channel status.

In initializing a transfer over either of the two transfer channels, the present invention first determines whether the base registers for the desired transfer channel are available. The local processor 122 programs or loads the transfer channel's base register set with the desired transfer information. The local processor 122 then loads the current register set from the base register and schedules a request by writing to the channel's transfer strobe register. If a transfer is in progress on the requested channel, the base to current register load will take place immediately after the data transfer on the requested channel has been completed.

The BMIC 118 may be programmed for burst or nonburst, data transfers to and from EISA memory. This is determined by a write to the channel configuration register. If a burst mode is enabled, BMIC 118 will look for a slave burst signal at the beginning of the transfer to determine if the slave device that is being addressed is capable of running burst cycles. If the slave device does not respond with an active slave burst signal, BMIC 118 will not attempt to make a burst transfer and will proceed with either a nonburst or mismatched data transfer.

In order to allow the local processor 122 (FIG. 3) to communicate with other devices in the computer system C (FIGS. 1, 2), the method of the present invention permits the local processor 122 to execute individual I/O or memory cycles over the EISA bus 46. These cycles can be thought of as being similar to "peek" and "poke" statements in the BASIC programming language. These cycles may be reads, writes or locked exchanges in 8, 16, 24 or 32 bit values. PEEK/POKE transfer cycles must be contained within a single double word. The peek/poke operation requires four 8 bit peek/poke address registers which are combined to provide the 32 bit peek/poke address; an 8 bit peek/poke control register which contains the bits defining whether the cycle is I/O or memory, peek (read)/poke (write) or locked exchange, and which bit enables are to be active during the cycle; and four 8-bit peek/poke data registers which are used to hold the data for the peek/poke cycle. To do an individual write cycle (poke), the local processor 122 loads the peek/poke address register to specify the 32 bit memory address or the 16 bit I/O address. The local processor 122 then loads the data to be transferred into the peek/poke data register set in the appropriate bit positions in the data register sets such that the data is transferred on the correct bit lanes during a 32 bit bus master transfer. The local processor 122 then loads the peek/poke control registers to specify the cycle type and to initiate the data transfer cycle. Bit 2 in the local status/control register will be set to a 1 by the BMIC 118 to indicate that a peek/poke request is pending and that the peek/poke registers are busy. When the poke cycle has finished executing on the EISA bus 46 the peek/poke status bit in local status/control register will return to normal (0). To perform an individual read cycle (peek), the local processor 122 loads the 32 bit memory address into the peek/poke address register. The local processor 122 then loads the peek/poke control register to initiate the read cycle. The peek/poke cycle bit 2 in the local status/control register will be set high by the BMIC 118 and remain active until the peek cycle finishes on the EISA bus 46. The local processor 122 can then read the data from the peek/poke data register. When a locked exchange cycle is requested by the local processor 122, a peek cycle is scheduled first and then immediately following by a poke cycle. A "LOCK" signal is asserted during the locked exchange cycle to indicate that no other access to the addressed location may be made.

The disk controller 112 will begin master mode operation any time a transfer request is pending. If more than one transfer request is pending, the disk controller 112 will service them in the following order: Peek/poke cycles have the highest priority access to the EISA bus 46, followed by the two data channels. Once the disk controller 112 has gained control of the EISA bus 46, the controller will first perform any peek, poke, or locked exchange transfers that may be pending. If there are no peek, poke or locked exchange transfers pending, the disk controller 112 will run data transfers initiate by either of the two transfer channels. The two transfer channels have equal priority with respect to each other and are serviced in an alternating fashion. The disk controller will continue to assert ownership of the EISA bus 46 until it has serviced all outstanding data transfer request or it is preempted from the EISA bus 46. The disk controller 112 may be configured to relinquish the EISA bus 46 immediately or for set time periods after a preempt signal is received across the EISA bus.

The transfer buffer interface 148 portion of the BMIC 118 provides for signals essential for interfacing to the disk array controller 112 to the physical disk array. The transfer buffer interface 148 is connected to a high speed data transfer controller and utilizes simple logic similar to that used in traditional DMA designs. This interface includes a 16 bit data bus, one clock input and seven control signals. The 16 data lines are used by the BMIC 118 to transfer the data to and from the transfer controller 124 (FIG. 3) in the disk array controller 112. The BMIC 118 automatically assembles the data received from the transfer controller 124 into 32 bit double words for 32 bit transfers over the EISA bus 46. The data lines are also used by the BMIC 118 to transport internally generated transfer start and real time addresses to the local processor 122 for use during data transfers. The transfer data buffer interface 148 includes four 8 bit transfer buffer interface registers: two base registers and two current registers all of which may be programmed with 16 bit start addresses by the local processor 122. Each transfer channel has an associated base and current register pair. The base registers contain the start address and the current registers provide the real-time addresses used to track the current to transfer. The current registers automatically advance address 1 each time a 16 bit word is transferred across the transfer buffer interface 148. The 16 bit start address is transferred from the transfer buffer interface 148 to the transfer channel controller 124 (FIG. 3) at the beginning of all new data transfers. The contents of transfer buffer interface 148 base registers are transferred to the transfer buffer interface 148 current registers. The BMIC 118 provides a load signal which may be used to latch the start address into an external address counter for use by the transfer channel controller 124.

The BMIC 118 may also be programmed by the local processor 122 (FIG. 3) to generate the transfer address each time an associated channel regains control of the EISA bus 46, in which instance, the address in the base register set is also the address in the real time register set. By programming bit 7 in the channel configuration register to a "1", a start address will be transferred to the transfer channel controller 124 at the beginning of all new transfers and the real time addresses will be transferred each time the associated channel regains control of the EISA bus 46. If bit 7 in the channel configuration register is set to a "0", the transfer start address will be transferred at the beginning of all new transfers and the real-time address need not be transferred to the current channel configuration register.

The BMIC 118 also includes two identical first in first out buffers (FIFOs), one per a transfer channel and a common data aligner for data transfers between computer system memory 58 and the disk array controller. The primary function of the FIFO/data aligner unit 146 is to isolate and simplify timing relationships between the EISA bus 46 and the devices in the disk array controller 112. The FIFO 146 allow the timing on the disk array controller 112 side of the BMIC 118 to be based on locally generated clock signals. This local clock may be independent of the EISA bus clock signal that governs EISA bus 46 timing. The FIFO also provides latency protection for wait states generated on either the EISA bus 46 or the disk array controller. Each FIFO 146 within the BMIC 118 is 24 bytes in size. The transfer data is loaded into the FIFOs from either the disk array controller 112 or the EISA bus 46 side, given the direction of the data transfer. The data is written into the FIFO as a double word during the data transfer. However, if the data is not a double word aligned, partial FIFO loads will be formed at the beginning or end of a transfer depending on the bit count, address program and the direction of the transfer. The condition of the FIFOs 146 may be determined by from the transfer channel status register set which will indicate whether the FIFOs 146 are stalled or active. A FIFO stall is defined as a FIFO that is full during an EISA read or empty during an EISA write. In either instance, the transfer channel controller 124 will be unable to maintain data transfer requested by the EISA device. If a FIFO stall occurs, the data transfer will be halted and the BMIC 118 will either service the transfer request with the highest priority or relinquish the EISA bus 46 to the computer system.

The data aligner function arranges the 16-bit data from the transfer channel controller 124 into an arbitrary bit alignment into system memory 58. The data aligner also performs the assembly and disassembly of the EISA data during the transfer. The data aligner 146 is also used to arrange bit alignment for the EISA bus 46 in the event of a misaligned double word boundary. The data aligner 146 will permit the BMIC 118 to do partial double word transfers as required at the beginning and the end of all such transfers.

The local processor interface 142 portion of the BMIC 118 contains two 8-bit registers through which the local processor 122 (FIG. 3) may access all the BMICs 118 internal registers. The registers are mapped into the local processor interface 142 and include a local data registers and a local index register. These registers are selected by the local processor 122 through the local processor interface 142 address lines. The local status/control register is also directly mapped into the local processor interface 142 and is used to provide the local processor 122 with interrupt peek/poke and base register status.

The local processor 122 (FIG. 3) and the EISA bus 46 communicate with each other through a set of command/status registers known as the shared I/O registers 144. The shared registers 144 include a set of mailbox registers, semaphore ports and doorbell registers. The mailbox registers are used to pass instructions and data to between the local processor and the EISA bus 46 and are controlled by the semaphore ports. The doorbell register set is utilized to inform the local processor 122 or EISA bus 46 side of the appearance of new messages. Also included as part of the shared I/O register set 144 are identification registers which are used to support EISA identification functions.

The two semaphore ports within the shared I/O register 144 are used for set and test functions in the I/O space. The ports are used to lock access to mailbox registers. Each of the two semaphore ports consist of a semaphore flag bit and a semaphore test bit. When a write occurs to the semaphore flag bit to either the EISA interface 140 or the local processor interface 142, the old value of the semaphore flag bit is copied to the appropriate semaphore test bit. The old value of the semaphore flag bit is then available and the test bit to be read back by either the local processor 122 or a device on the EISA bus 46. If the value read back from the semaphore test bit is a "1", the requested resource is unavailable for use. Conversely, if the value read back is a "0", the requested resource is available for use and will be locked by the requesting processor or bus master.

The mailbox register set comprises a set of sixteen 8-bit general-purpose registers utilized to pass information between the disk array controller and the EISA system C. The sixteen registers are mapped continuously into EISA slot-specific I/O space and may be accessed as bits, words or double words. The registers may be used directly to pass command and status information or may be used as pointers to larger command blocks in memory. The mailbox registers may be read or written at either time from either the EISA bus 46 or the local processor interface 142. The mailbox register set also includes an internal arbitration scheme which will prevent the existence of indeterminate bits in the event there is a simultaneous read and write from both sides of the mailbox register.

The shared I/O register 144 set also includes two 8-bit doorbell interrupt/status registers; one assigned to the EISA side and one assigned to the disk array controller side. The EISA system doorbell register set is utilized by the local processor 122 to request service from the EISA side of the BMIC and the local doorbell register is utilized by a device on the EISA side of the BMIC 118 to send an interrupt request to the local processor 122 on the disk array controller. The 8-bits in each doorbell register permit up to eight separate devices or events in each direction to have interrupt request simultaneously pending. Each doorbell register has an associated 8-bit interrupt enable register which may be used to enable or disable the interrupts for the doorbell register on an individual basis. The BMIC 118 also includes a system interrupt enable/control register and a local status/control register used to disable the system and local interrupts and to verify the status of the system and local interrupts on a global basis. Each device or event that may interrupt the disk array controller 112 may be assigned a bit position within the BMIC's 118 local interrupt/status doorbell register. When the device on the EISA bus 46 attempts to send an interrupt request to the disk array controller, it writes to the local interrupt/status doorbell register from the EISA side with the devices assigned bit position set active. This will set that bit in the local interrupt/status doorbell register but leave other bits in the register unaffected. If that bit position has not been disabled by the system interrupt enable/control register, the interrupt signal will be passed on through the local processor interface 142 to the local processor 122. When the local processor 122 services the interrupt, it will read the local status/control register to determine the source of the interrupt. If the control register indicates that the local doorbell register is one of the enabled interrupt sources, the local processor 122 will read the local doorbell register to determine which bits are active and the requesting interrupts. The local processor services one of the request from the local doorbell register, it will write to the local doorbell register with the bit position set. This will cause that bit in the local doorbell register to reset but the other bits will remain unaffected.

The method of the present invention is implemented as a number of application tasks running on the local processor 122 (FIG. 3). Because of the nature of interactive input/output operations, it is impractical for the present invention to operate as a single batch task on a local processor 122. Accordingly, the local processor 122 utilizes a real time multitasking system which permits multiple tasks to be addressed by the local processor 122, including the present invention. Preferably, the operating system on the local processor 122 is the AMX86 Multitasking Executive by Kadak Products Limited. The AMX operating system kernel provides a number of system services in addition to the applications set forth the method present invention.

IV. Command Protocol Definition

Figure 5:
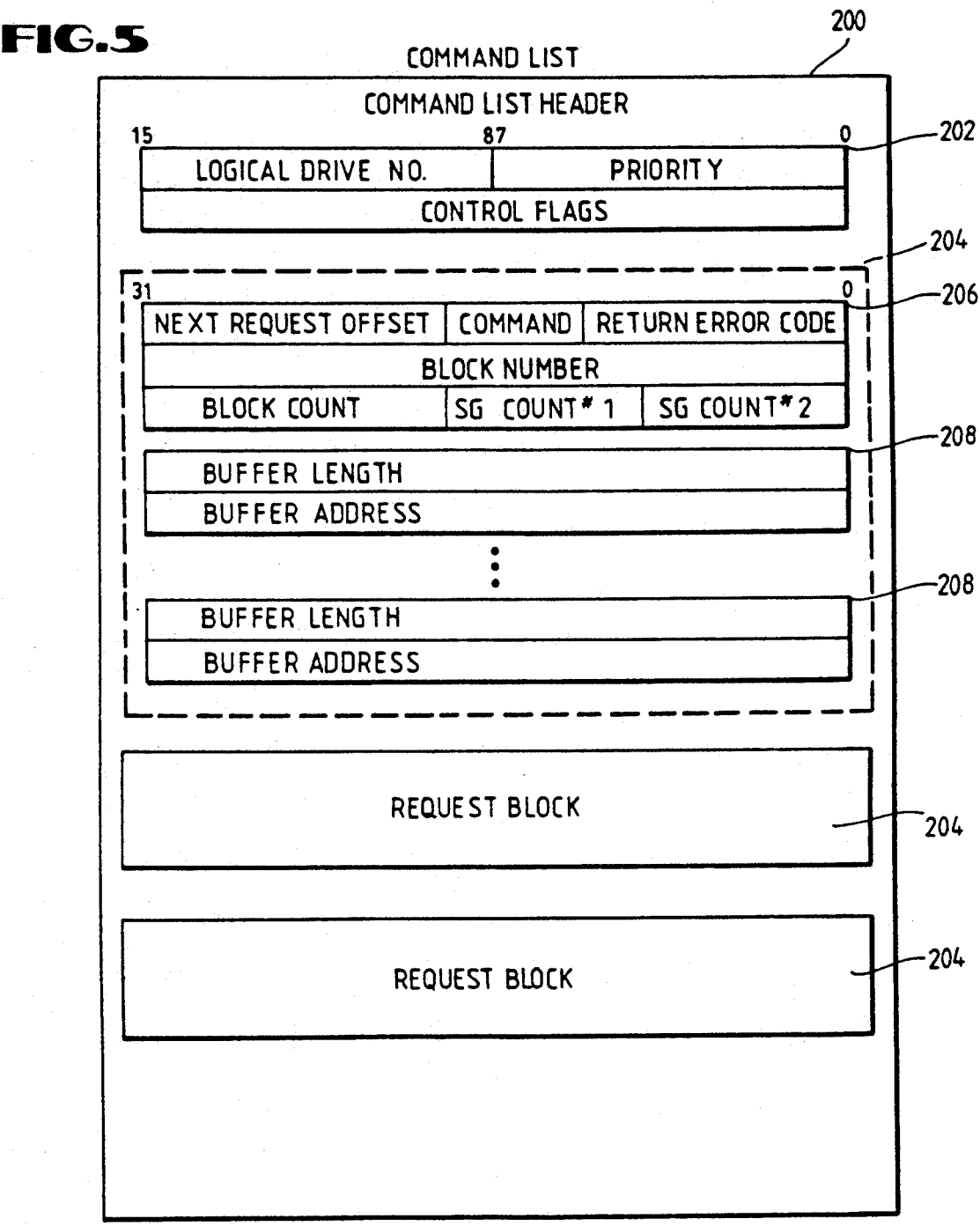
FIG. 5 is a schematic diagram depicting a command list, including command list header and request blocks.

Referring now to FIG. 5, the method of the present invention includes the development of a data structure for the disk array controller 112 known as a command list 200. The command list 200 consists of a command list header 202, followed by a variable number of request blocks 204. The request blocks are variable in length and may be any combination of I/O requests which will be described further below. A command list 200 typically contains a number of related request blocks 204; from 1 to any number that take up less than 16 Kbytes of memory. The command list header 202 contains data that applies to all request blocks 204 in a given command list 200: logical drive number, priority and control flags. The request blocks 204 consist of a request block header 206 and other requested parameters, given the nature of the request. The request block header 206 has a fixed length, whereas other request parameters are variable in length.

The individual request blocks 204 each represent an individual I/O request. By forming a command list 200 out of several individual request blocks, and submitting the command list 200 to the disk array controller 112 (FIG. 2), the computer system C microprocessor 20 overhead is reduced.

Still referring to FIG. 5, a command list header 202 contains information that applies to each of the request blocks 204 contained in the command list 200. The command list header 202 is a total of 4 bytes in length. The logical drive number specifies to which logical drive that all request blocks 204 within the command list 200 apply.

The method of the present invention permits a total of 256 logical drives to be specified. The priority bit is used to provide control over the processing of a command list. The disk array controller 112 is capable of operating upon many command list concurrently. In specifying priority the method of the present invention permits a command list to be processed prior to those already scheduled for processing by the disk array controller. The control flag bytes under the method of the present invention are used for error processing and ordering of request of the same priority. Ordered requests are scheduled according to priority, however, they are placed after all previous request of the same priority. If all requests are of the same priority and the order flag is set, the request are performed on a first come, first-serve basis.

Error condition reporting options are specified by error flags in the control flag bytes. In the event of an error, the disk array controller 112 can either: notify the requesting device and continue processing request blocks 204 in the list; notify the requesting device and stop processing of all other request blocks 204 in the list; or not notify the requesting device of the error. In all instances, an error code will be returned in the command list status register at the time the next command list complete notification and in the error code field in the request block 204 where the error occurred. Further, notification of completion may be set for each individual request block 204 or for the entire command list 200. In the event the EISA bus 46 is to be notified each time a request block has been completed a "notify on completion of every request" flag may be set in the control flags field.

A request block 204 is comprised of two parts, a fixed length request header 206 and variable length parameter list 208. The parameters are created as data structures known as scatter/gather (S/G) descriptor counters which define data transfer addresses. The request header 206 fields contain a link to the next request block 204, the I/O command, space for a return status, a block address and a block count, and a count of the scatter/gather descriptor structure elements for two S/G descriptor counters. The request header is a total of 12 bytes in length.

The scatter/gather descriptor counters are used to designate the number of scatter/gather descriptors 208 which utilized in the particular request. The number of scatter/gather descriptors 208 associated with the request block 204 will vary. Further, if the command is a read command, the request may contain up to two different sets of scatter/gather descriptors. Thus, the present invention is capable of reading data from two different areas in system memory. Each scatter/gather descriptor 208 contains a 32 bit buffer length and a 32 bit address. This information is used to determine the system memory data transfer address which will be the source or destination of the data transfer. Unlike the requests blocks 204 in the command list, the scatter/gather descriptors must be contiguous and, if there exists a second scatter/gather descriptor set for a request, it must directly follow the first set of scatter/gather descriptors.

A command list 200 has a variable number of request blocks 204. In order to quickly and efficiently traverse the list of variable request blocks 204 the request header includes a pointer or next request offset which specifies an offset of "n" bytes from the current request block address to the next request block. This field makes the command list 200 a set of linked list request blocks 204. The last request block 204 has a value of 000h in the next request offset to signify the end of the command list 200. Thus, the method in the present invention permits memory space between request blocks 204 within a command list 200 which may be used by an operating system device driver. However, it should be noted that the greater the extra space between the request blocks 204 longer it will require the disk array controller 112 to transfer the command list 200 into its local memory.

The command specifies the function of the particular request block and implies the format of the parameter list. The commands supported by the disk array controller 112 of the preferred embodiment include:

COMMAND

IDENTIFY LOGICAL DRIVE
IDENTIFY CONTROLLER
IDENTIFY LOGICAL DRIVE STATUS
START RECOVERY
READ
WRITE
DIAGNOSTIC MODE
SENSE CONFIGURATION
SET CONFIGURATION

Identify logical drive is used to identify the defined logical drives within the disk array. Processing of the command returns information related to the logical drive in a 28 byte buffer. Information included is block length; number of blocks; logical drive parameter table entry; and fault tolerance type. If a logical drive is not defined, the length and number of blocks for that logical drive will be returned as 0 values. In the current implementation of the present invention only logical drives 0 and 1 may be defined.

Identify controller is used to identify the configuration of the disk array controller 112. It returns information in a 256 byte buffer and is used primarily to return the number of logical drives that are defined. In the present implementation of the current invention, information returned includes the number of logical drives, the configuration signature for the disk array controller; and the firmware revision for the disk array controller.

Identify logical drive status is used to indicate the status of a particular logical drive. Information is returned after processing of this command in a 256 byte buffer. Information includes the logical drive status and drive failure assignment information. Possible values that may be returned regarding the logical drive status include: the logical drive failure; logical drive needs to be configured; logical drive is operating in the regenerate mode; logical drive is ready to start recover; and logical drive will resume recover after a power off. The start recover command is a command used exclusively by the computer system C ROM memory during a post. This command gives the disk array controller permission to start the recovery process.

The I/O commands instruct the disk array controller to perform scatter/gather operations on sequential blocks of data. This scatter/gather descriptor structure is used by the disk array controller to locate data within the array for transfer. The descriptor structure may specify buffer addresses and buffer lengths for data to be transferred to or from system memory 58. The total buffer length must equal the number bytes to be transferred for any I/O operation.

The read command transfers sequential blocks of data from the disk into buffers in the system memory 58.

Two scatter/gather descriptors are available to specify dual destinations for the data. The present invention also includes a method for specifying partial block transfers. If an initial buffer address is 0FFFFFFFh (NULL), the present invention will skip to the offset of the requested bytes and the data for the specified interval is effectively ignored. The present invention will then read the remainder of the data within the particular block and transfer it to the address as requested. A null address will generate an error during a write operation.

The write command transfers data from the system memory 58 and writes it to sequential blocks on the disk drive array. The scatter/gather descriptor count number 2 is ignored by a write command.

The diagnostic command is a special command in the present invention that allows the direct manipulation of hardware. This command is generally issued as the only request in a command list. The only valid field in a diagnostic command is the command field. If there exist any outstanding request when the diagnostic command is submitted, an abort error will be returned. Once the disk array controller has been placed in a diagnostic mode the disk array controller is ready to except diagnostic commands upon receipt of the command complete notification. The disk array controller will remain in diagnostic mode until otherwise notified and will not process nondiagnostic command list.

The sense configuration command is used to determine the configuration of a disk array controller and returns the information to a 56 byte buffer. Information returned includes a configuration signature which is supplied by the EISA configuration utility and is written on the reserved sectors on each of the physical drives. The configuration signature is used by the disk array controller 112 firmware to reliably identify that a physical drive is a member of the configured drive array. The sense configuration buffer also includes information relating to whether a compatibility port has been configured to be the primary or secondary means of entry into the disk array. The sense configuration buffer also includes a value which indicates the type of operating system that has been specified during EISA configuration. This command also returns information regarding the total number of physical drives detected by the configuration utility through the diagnostic mode; the number of physical drives assigned to the logical drive during the configuration utility; the type of fault tolerance mode (parity versus mirror) assigned to the logical drive by the configuration utility. The sense configuration buffer also includes information relating to the specific drive parameter such as sectors per cylinder, number of cylinders, number of heads, and number of platters. The buffer returned upon completion of the sense configuration command also includes logical drive parameters supplied by the configuration utility and a bit map indicating which physical drives are assigned to the particular logical drive.

The method of the present invention relies upon a communication protocol utilizing unidirectional channels to communicate between the system processor 20 and the disk array controller local processor 122. The channel that is used to submit a new command list 200 to the disk array controller 112 is also used to send the length of the command list 200 in bytes and a tag I.D. used to identify the command list 200. The length is required so that the disk array controller 112 may allocate the proper amount of memory in its local memory to process the command list. The tag I.D. is used exclusively by the operating system device driver and does not effect the processing of the command list 200 by the disk array controller 112. The channel that returns the command list 200 completion and error notifications uses the addresses of the command list 200 and offset pointer to the request block 204 that generated the notification, the command list 200, the status at the time of notification, and the tag I.D. given when the command list 200 was submitted.

V. System Operation

A. Overview of Command Submission

Figure 6:
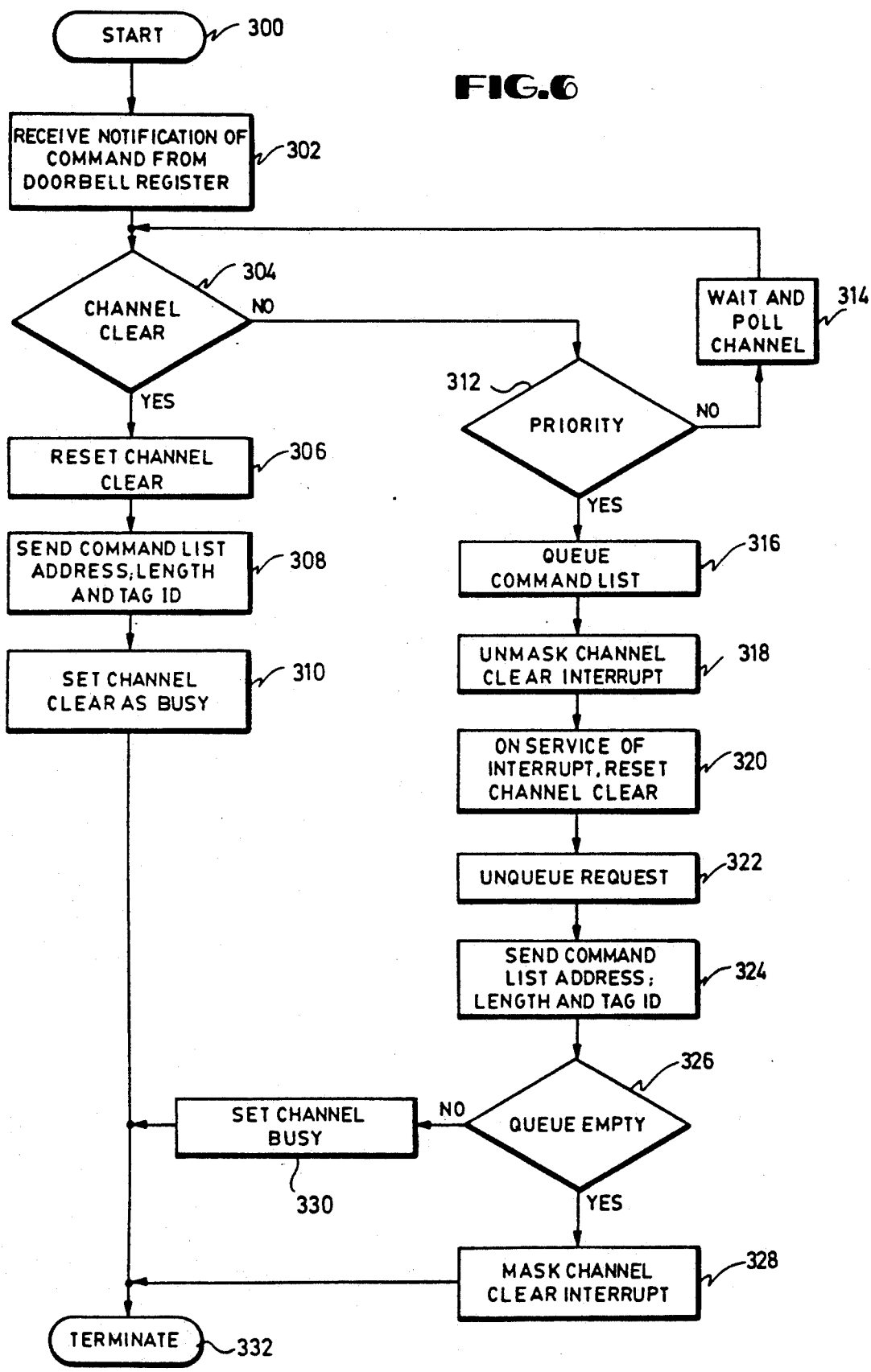
FIG. 6 is a flow diagram depicting the manner in which I/O requests are submitted to the disk array controller of the present invention.

When a new command list 200 is submitted to the disk array controller 112, the system processor 20 determines if the transfer channel is clear. If the channel is busy, the system processor 20 may poll, waiting for the channel to clear, or it may unmask the channel clear interrupt so that it will be notified when the disk array controller clears the channel. FIG. 6 is a flowchart of the method used to submit a new command list 200 to the disk array controller 112. Operation of submission begins at step 300. The local processor 122 receives notification of submission a command list from the doorbell register in step 302 via BMIC 118. Control transfers to step 304 where the local processor 122 determines whether the channel 0 (command submission channel) is clear. If the channel is clear, control transfers to step 306 which resets the channel clear bit. Control transfers to step 308 in which the BMIC 188 loads the command list address, length and tag I.D. into a ring queue. When the queue is serviced by the local processor 122, the command list is transferred to the mailbox registers to be read by the local processor 122. Control transfers to step 310 in which the local processor 122 sets the channel clear bit to busy. Control transfers to step 332 which terminates the submission of the command. If in step 304 the local processor 122 determines that the command submit channel is not clear, the local processor 122 continues to poll for channel clear. If the channel is clear, control transfers to step 304. If the local processor 122 determines in step 312 that the command list submission is a priority submission, control transfers to step 316 which queues the command list to be transferred. Control transfers to step 318 in which the local processor 122 unmasks the channel clear interrupt bit. On service of the interrupt by the local processor, control transfers to step 320 which resets the channel clear. Control transfers to step 322 the local processor dequeues the command list. Control transfers to step 324 which loads the command list address, length and tag I.D. into the channel registers. Control transfers to step 326 which determines whether the command list submission queue is empty. If the command list submission list queue is empty, control transfers to step 328 in which the local processor 122 masks the channel clear interrupt bit. Control transfers to step 332 which terminates the command list submission. If the local processor determines in step 326 that the queue is not empty, control transfers to step 330 which sets the channel busy bit. Control is then transferred to step 332 which terminates the submission of the command list.

B. Overview of Command Completion Notification

FIG. 7 is a flow diagram overview of the manner in which the present invention notifies the device issuing the command that the command has been completed by the disk array controller 112. Processing begins in step 350. In step 352 the local processor 122 loads the command list address, block offset, status and tag I.D. are loaded into transfer registers. Control transfers to step 354 in which the local processor 122 resets the channel 1 bit as busy. Control transfers to step 356 in which the channel 1 clear bit is set. Control transfers to step 358 where the local processor 122 determines whether there exists a non 0 block offset. If this is a 0 block offset, control transfers to step 360 which processes the command list as complete. Control transfers to step 374 which terminates operation of the notification procedure.

If the local processor 122 determines in step 358 there to be a non 0 block offset, control transfers to step 352 which adds the offset to the base address. Control transfers to step 364 in which the local processor 122 determines whether the command list request status has an error codes set. If there is an error code set, control transfers to step 368. If there is no error code set, control transfers to step 366 in which the local processor 122 processes the request block to completion. Control transfers to step 370. If in step 364 the local processor 122 determines there has been an error code set, and the system has been notified in step 368, control transfers to step 370. In step 370 the local processor 122 determines if more request blocks exist in the command list. If yes, control transfers to step 362 and the local processor 122 continues to loop until all request blocks have been processed as completed. If there are no more request blocks, control transfers to step 372 in which the local processor 122 processes the command list as completed. Control transfers to step 374 which terminates notification procedure.

C. Command Protocol System

The first of the modules within the method of the present invention addresses initialization of the disk array to carry out the method. In this module, the local processor 122 initializes all the BMIC 118 hardware and variables utilized in the method. Further, the module installs the BMIC Interrupt Service Procedure.

The BMIC Interrupt Service Procedure sets forth the manner in which the BMIC 118 services requests and/or interrupts between the system processor 20 and the local processor 122.

1. Initialization

FIG. 8 is a flow diagram of a program task designed to install the command passing and protocol used within the present invention. Operations commence with step 400. Control transfers to step 402 where the local processor 122 installs the BMIC 118 interrupt service procedure described in more detail below. Control transfers to step 404 in which the local processor 122 installs the transfer channel controller 148 and disk drive interrupts. Control transfers to step 406 wherein the local processor 122 initializes the shared registers and semaphore ports. Control transfers to step 408 in which the local processor initializes the local doorbell registers, doorbell interrupts and masks. Control transfers to step 410 in which the local processor 122 initializes the EISA doorbell registers, interrupts and mask. Control transfers to step 412 wherein the local processor disables the local processor interrupts and sets the BMIC 118 local processor interface interrupts. Control transfers to step 414 where the local processor 122 re-enables the local processor interrupts. Control transfers to step 416 which terminates the initialization procedure.

2. Local Processor Interrupt Procedure

Figure 11:
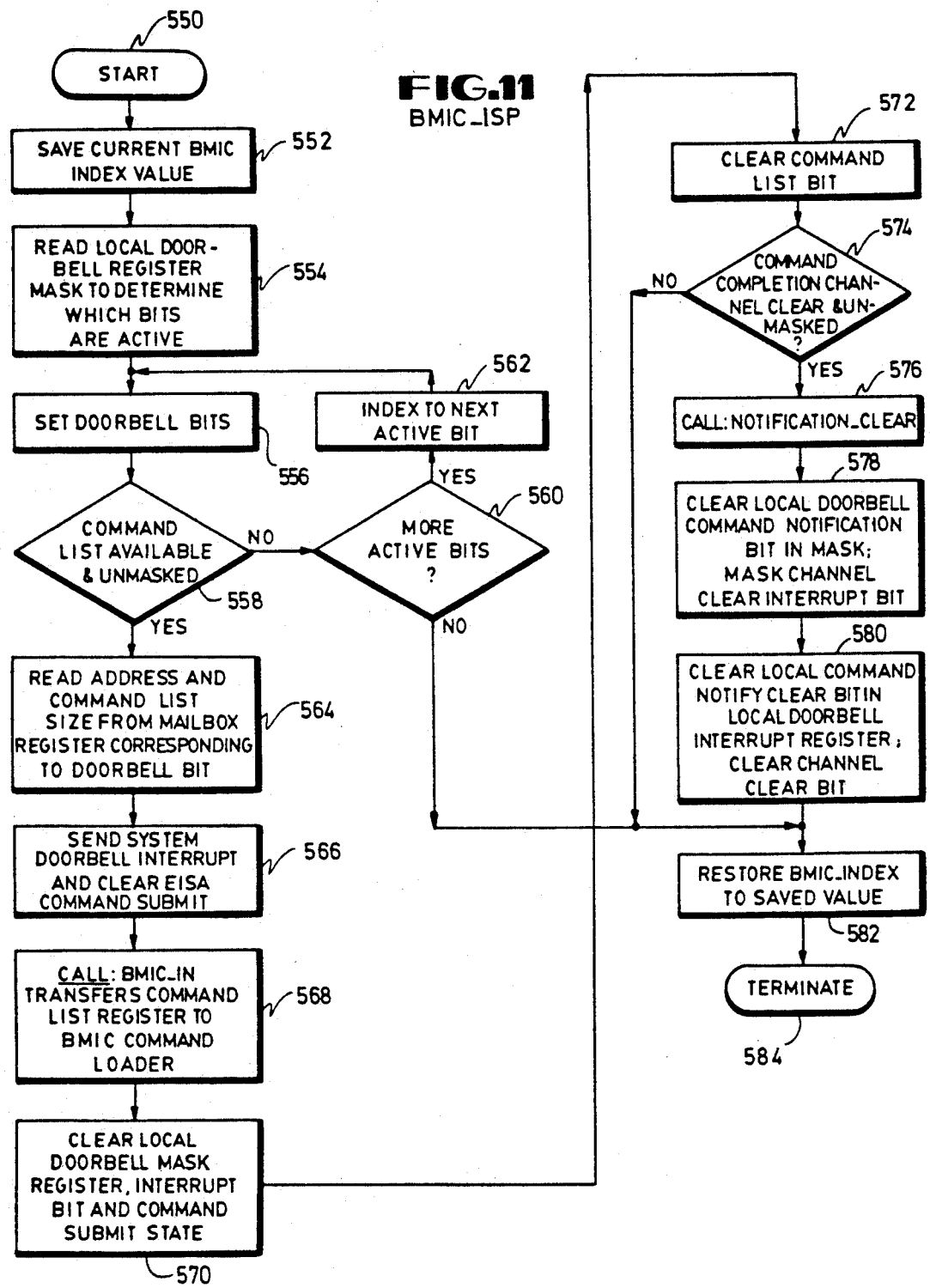
FIG. 11 is a flow diagram of the manner in which the present invention processes interrupts from either the EISA bus or disk array controller.

FIG. 11 is a flow diagram of the method used to monitor interrupt requests received by the BMIC 118 and local processor 122. Operation begins at step 550. The local processor 122 transfers control to step 552 in which the local processor 122 saves the current BMIC index value. Control transfers to step 554 wherein the local processor reads the local doorbell register mask to determine which bits are active. Control transfers to step 556 in which the local processor sets the local doorbell bits. Control transfers to step 558 in which the local processor determines whether the address for the command list which has arrived at the mailbox corresponding to the active doorbell bits is available and unmasked. If it is determined that it is not available or it is not unmasked, control transfers to step 560 in which the local processor 122 determines whether other doorbell bits have been set as active during this interrupt service. If other bits are set active, control transfers to step 562 in which the local processor 122 indexes to the next active bit and control transfers to step 556. If in step 560 it is determined there are no other active bits, control transfers to step 582. If in step 558 it is determined that the current doorbell bit and its associated mailbox register are unmasked and the local processor 122 has the address for the command list, control transfers to step 564, in which the local processor 122 reads the command list address and size from the mailbox register corresponding to the doorbell bit. Control transfers to step 566 where the local processor sends a system doorbell interrupt and clears the EISA command submit bit. Control transfers to step 568 in which the local processor 122 calls the function BMIC_IN which transfers the command list to the BMIC command loader. Control transfers to step 570 where the local processor 122 clears the local doorbell mask bit interrupt bit and the command submit state. Control transfers to step 572 in which the local processor clears the command list bit. Control transfers to step 574 in which the local processor determines whether the command competition channel is clear and unmasked. If not clear and unmasked, control transfers to step 582. If clear and unmasked, control transfers to step 576 where the local processor 122 calls function NOTIFICATION_CLEAR to indicate that the interrupt has been serviced. Control transfers to step 578 which clears the local doorbell command notification bit in the mask and the mask channel clear interrupt bit. Control transfers to step 580 where the local processor 122 clears the local command notify clear bit in the local doorbell interrupt register. Further, the local processor 122 clears the channel clear bit. Control transfers to step 582 in which the local processor 122 restores the saved BMIC_INDEX value to the current BMIC index register. Control transfers to step 584 which completes operation of this function and control is to the local processor operating system.

The next set of modules are used in logical command receipt by the BMIC 118 and local processor 122. These routines include servicing a system processor interrupt and obtaining the command list. In the following module, the local processor parses the command list to determine if the commands contained therein are valid commands. The third module also performs a parse function, but on an individual request basis as opposed to the entire command list.

3. Logical Command Submission

Figure 9:
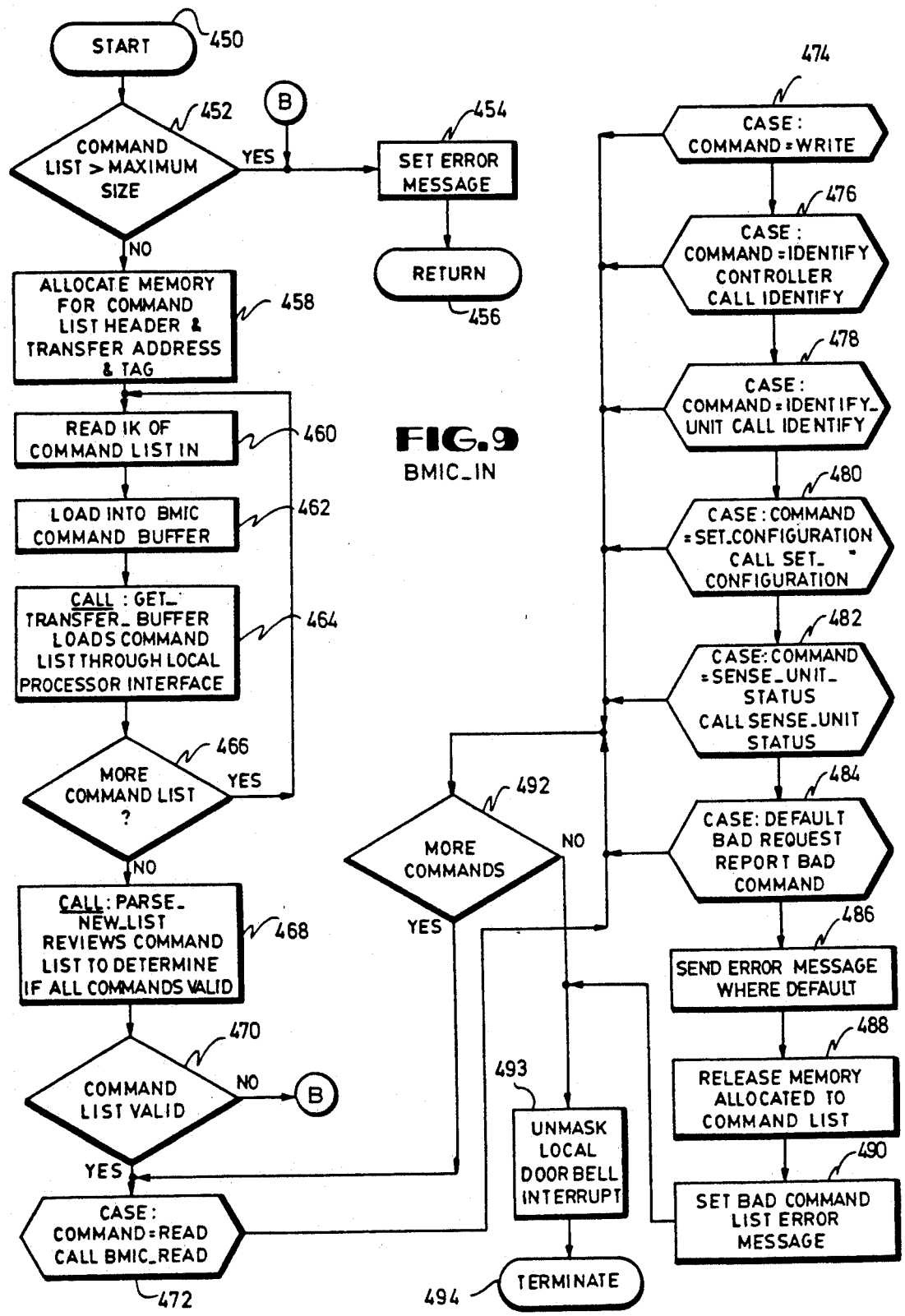
FIG. 9 is detailed flow diagrams showing the manner in which logical commands are processed.

FIG. 9 is flow diagrams of the processing of commands sent using the protocol command structure at the present invention. The submission of commands to the local processor was described previously in FIG. 6. FIGS. 9A and 9B describe the manner in which the local processor 122 and the BMIC 118 and transfer channel controller 126 operate within the method of the present invention. Operation begins in step 450 following the submission of a command as described in FIG. 6. In step 452 the local processor 122 determines whether the command list exceeds the maximum 16 Kbyte size permitted by the present invention. If the command list exceeds the maximum size, control transfers to step 454 in which an error message is set and control transfers to step 456 which returns to the local processor operating system with an error message. If the local processor determines in step 452 that the command list does not exceed the maximum 16 Kbyte size, control transfers to step 458. In step 458, the local processor allocates local memory for the command list header, transfer address and tag I.D. Control transfers to step 460 wherein the local processor 122 reads the first 1K byte of the command list. Control transfers to step 462 which loads the command list header, transfer address and tag I.D. into the BMIC command buffer. Control transfers to step 464 in which the local processor 122 calls routine get_transfer_buffer which loads the command list into the local processor through the local processor interface 124. Control transfers to step 466 in which the local processor 122 determines whether additional elements of the command list exist. If there are additional parts to the command list, control transfers back to step 460 which continues to read in the command list in a maximum 1K byte increments until the command list has been totally transferred into the local processor memory. If the local processor 122 determines in step 466 that there are no additional elements to the command list, control transfers to step 468 where the local processor 122 calls the function PARSE_NEW_LIST to review the command list to determine if all the commands and requests therein are valid. Control transfers to step 470 in which the local processor 122 reviews the code set by PARSE_NEW_LIST to determine if the command list is valid. If the command list is not valid in its entirety, control transfers to step 454 which sets an error message indicating that the command list is not valid. Control transfers to step 456 which returns to the local processor 122 operating system. If in step 470 the local processor 122 determines that the command list is valid, control transfers to step 472 through 484 which reads the particular command request and calls the correct command set. If the command is a read command step 472 calls BMIC_READ function. If the command is a write command step 474 also calls BMIC_READ. If the command is an identify controller command, step 476 calls the identify function. If the command is an identify unit, step 478 also calls the identify function. If the command is a set configuration, step 480 calls the set configuration function. If the command is a sense unit status command step 482 calls the sense unit status function. In the event that the command is not one of the above cases, control transfers to step 484, which is the default command and is reported as a bad command or error command. If the command was one of the commands listed in step 472 through 482, control transfers to step 492 in which the local processor 122 determines if there are additional command requests in the command list. If there are more commands in the command list, control transfers to step 472 in which the local processor 122 again examines the command and calls the proper function. If there are no further commands in the command list, control transfers to step 492.

If in step 484 it is determined that the command is a bad request, control transfers to step 486 which sets an error message that the command was not one of the commands recognized by BMIC_IN. Control transfers to step 488 which releases the local memory allocated to the command list. Control transfers to step 490 in which the local processor 122 sets a bad command list error message. Control transfers to step 492 in which the local processor 122 unmasks the local doorbell interrupts, indicating that it has either completed processing of the command list or that the command lists an error. Control transfers to step 494 which returns to the local processor 122 to operating system task.

4. Command List Parse/Review

Figure 22A:
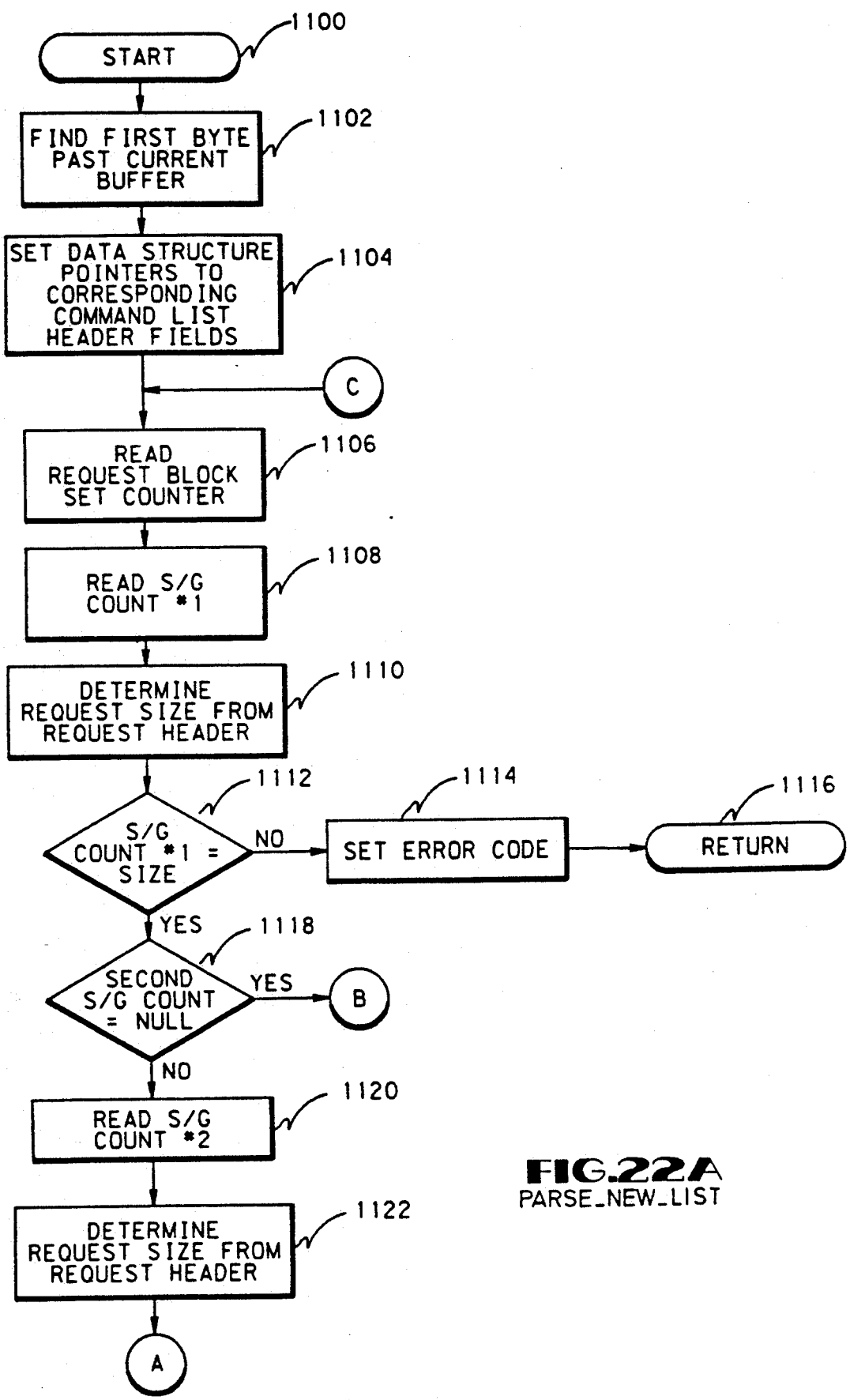
FIGS. 22A and 22B are flow diagrams of the manner in which the present invention will read a request list to determine initial validity.
Figure 22B:
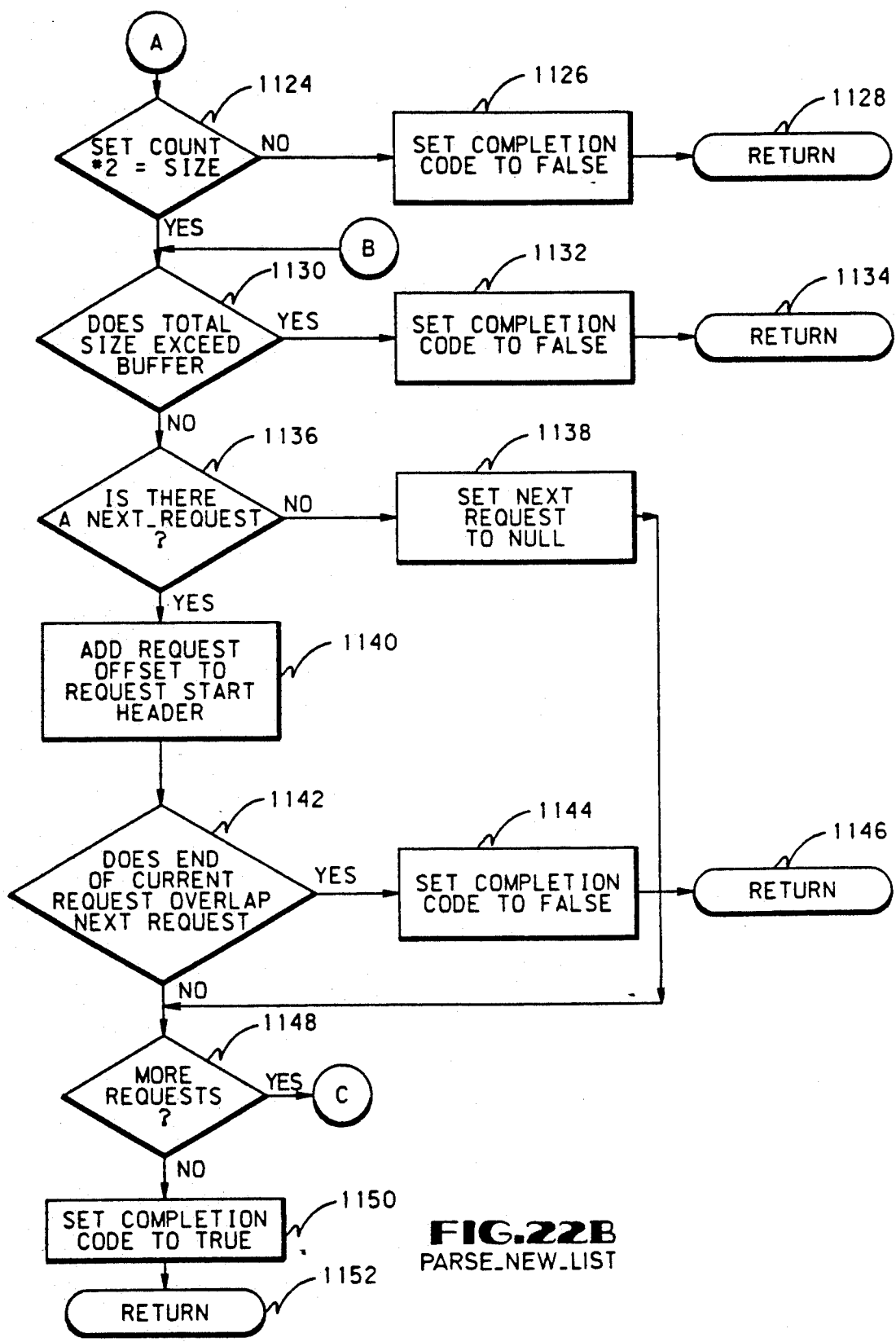

FIGS. 22A and 22B are flow diagrams for the PARSE_NEW_LIST function which is utilized by the present invention to verify the validity of the command list 200 submitted to the disk array controller 112. PARSE_NEW_LIST is called in step 1100. Control transfers to step 1102 wherein the local processor 122 finds the first byte past the current buffer. Control transfers to step 1104 where the local processor sets data structure pointers to correspond to command list header fields. Control transfers to step 1106 in which the local processor 122 reads the request block counter. Control transfers to step 1108 in which the local processor reads scatter/gather count number 1 fields in the command list header. Control transfers to step 1110 in which the local processor determines the command request size from the request header information. Control transfers to step 1112 in which the local processor determines whether the scatter/gather count number 1 is equal to the size in bytes specified for that particular scatter/gather descriptor. If the scatter/gather count is not equal, control transfers to step 1114 which sets an error code and control is transferred to step 1116 which returns to the calling program with the error code. If the local processor 122 determines in step 1112 that the scatter/gather count number 1 is equal to the size specified, control transfers to step 1118 where the local processor 122 determines whether the second scatter/gather count is non-null. If the second scatter/gather count is null, control transfers to step 1130. If the second scatter/gather count is not null, control transfers to step 1120 where the local processor 122 reads the second scatter/gather count in the request header. Control transfers to step 1122 where the local processor 122 determines the size of the request from the request header. Control transfers to step 1124 where the local processor 122 determines whether the second scatter/gather count is equal to the size of the data. If the second scatter/gather count is not equal, control transfers to step 1126 which sets completion code to false and control is transferred to step 1128 which returns to the calling program. If the second scatter/gather count is equal to the proper size, control transfers to step 1130 where the local processor 122 determines whether the total size of the command list exceeds the maximum 16 Kbyte buffer for each command list and that the size of the command list specified in the command header matches actual size. If the total size of the command list 200 exceeds the allotted buffer size, control transfers to step 1132 in which the local processor 122 sets a completion code equal to FALSE and control transfers to step 1134 which returns to the calling program. If the total size of the command list is equal to or less than the maximum 16 Kbyte buffer, control transfers to step 1136 where the local processor 122 determines if there is a next request following the current command list request. If there is no next request, control transfers to step 1138 wherein the local processor 122 sets the next request to null. Control then transfers to step 1148. If there is a next request, control transfers to step 1140 in which the local processor 122 adds the request offset for the next request to the current request start header. Control transfers to step 1142 where the local processor 122 determines whether the end of the current request overlaps the calculated address for the next request. If an overlap does occur, control transfers to step 1144 where the local processor 122 sets a completion code equal to FALSE and control transfers to step 1146 which returns control to the calling program. If there is no overlap, control transfers to step 1148 wherein the local processor 122 determines whether there are additional request in the command list 200. If there are additional request in the command list 200, control is transferred to step 1106 and the function continues to PARSE the list until the list has been fully PARSED. If there are no additional requests, control transfers to step 1150 which sets a PARSE completion code equal to TRUE. Control transfers to step 1152 which returns control to the calling program.

5. Next Disk Request Review

Figure 26:
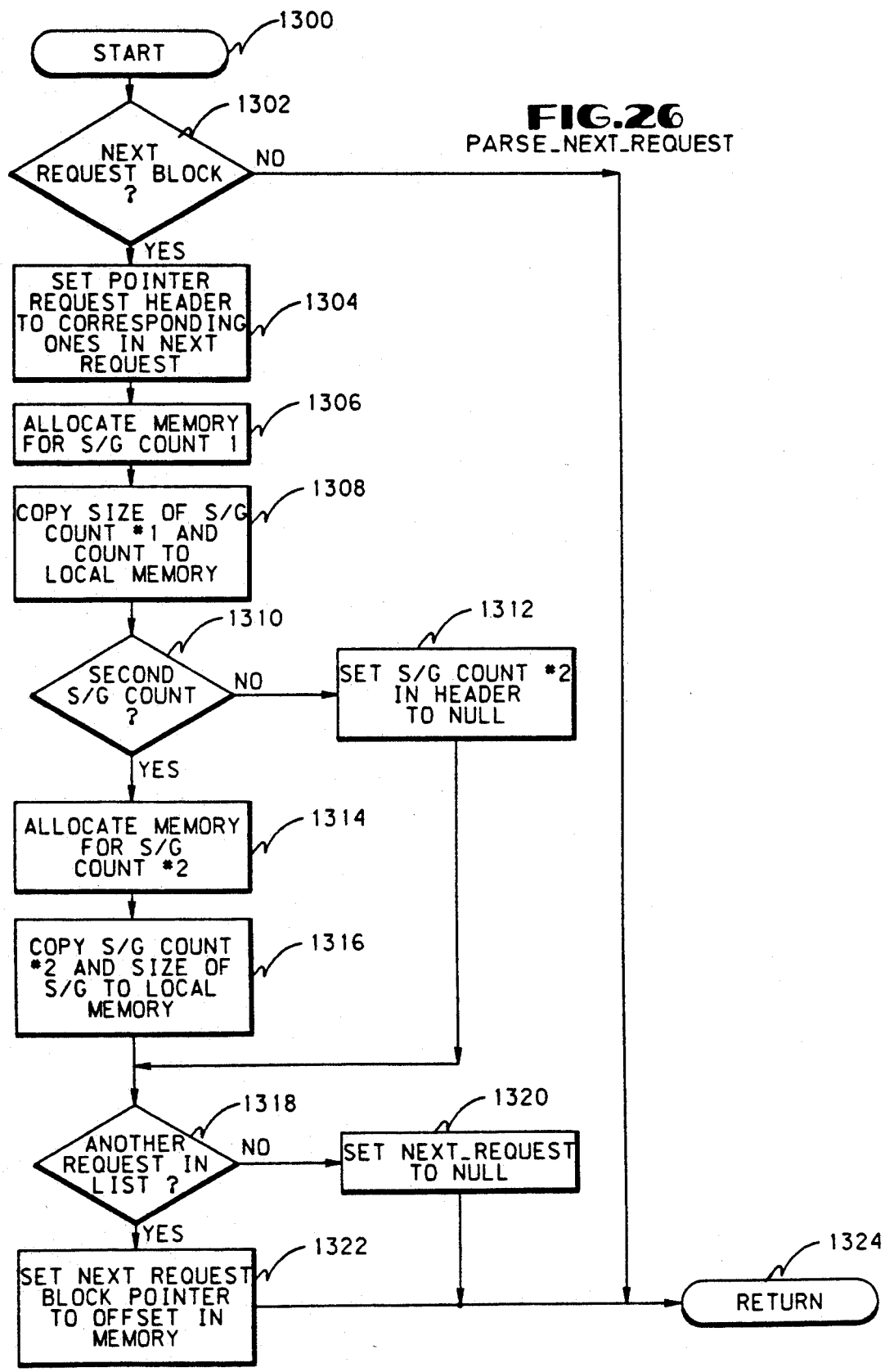
FIG. 26 is a flow diagram of the manner in which the present invention reviews and determines the initial validity of a request.

FIG. 26 is a flow diagram for the PARSE_NEXT_REQUEST function which parses the next request from the command list and builds a data structure for the particular request. The PARSE_NEXT_REQUEST function is called in step 1300. Control transfers to step 1302 where the local processor 122 determines if there is a next request block relative to the current request. If there is no next request block, control transfers to step 1324 which returns control to the calling program. If there is a next request block, control transfers to step 1304 where the local processor 122 sets the pointers in the request header to the corresponding next request offset. Control transfers to step 1306 where the local processor 122 allocates local memory for the S/G count 1. Control transfers to step 1308 where the local processor 122 copies the size of the S/G count 1 and count to the local memory. Control transfers to step 1310 where the local processor 122 determines if the request header includes a second S/G count. If there is no second S/G count, control transfers to step 1312 where the local processor 122 sets the S/G count number 2 to null and the request header to null. Control transfers to step 1318. If step 1310 determines that there is a second S/G count field, control transfers to step 1314 where the local processor 122 allocates local memory for the S/G count number 2. Control transfers to step 1316 where the local processor 122 copies the S/G count number 2 and the size of the S/G count to local memory. Control transfers to step 1318. In step 1318, the local processor 122 determines if there is another request in the command list. If there are no other request in the command list, control transfers to step 1320, in which the local processor sets the next request pointer to null. Control transfers to step 1324 which returns control to the calling program. If there are additional requests in the list, control transfers to step 1322 wherein the local processor 122 sets the next request block pointer to offset in the request list header. Control transfers to step 1324 which returns control to the calling program.

The next set of modules address the manner in which the method of the present invention transfers data to and from the host and the disk array. The SG_BLOCK module is used to scatter or gather one block of data into or out of the transfer buffers managed by computer system memory. The BMIC_XFER module is used to transfer mutiple blocks of data to or from the computer system C utilizing multiple scatter/gather descriptors 208 which are defined in the logical request 204. The BMIC_XFER_QUEUE module merely queues an incoming transfer request. The BMIC_READ module is used by the local processor 122 to read transfer buffers in the disk controller 112 and transfer the data to the host system. Similarly, the BMIC_WRITE module is used by the BMIC to write data from the host memory to transfer buffers in the disk array controller 122. The PEEK module sets forth the method by which the present invention reads one byte of data in system memory. Similarly, the POKE module sets forth the method for writing one byte of data to system memory.

6. Scatter/Gather Block Transfer

FIGS. 18A and 18B represent a flow diagram for the SG_BLOCK method of transferring data to and from the disk array controller. This method of transferring the data is used in those incidences wherein the command list may contain more than one scatter/gather descriptor block per command request. Operation of the SG_BLOCK function begins at step 960. Control transfers to step 962 in which the local processor 122 scans the scatter/gather array for count and determines the address of the start descriptor block. Control transfers to step 964 wherein the local processor 122 determines the host address and the size of the transfer to be made. It should be noted that the host address may include the address of data to be transferred to the host or, the address of data which will be transferred from the host to the disk array controller. Control transfers to step 966 wherein the local processor 122 determines whether calculated address for the beginning of the block is a null address or 0FFFFFFFH. If the calculated address is equal to null, control transfers to step 968 which sets SG_TRANSFER flag to FALSE. Control transfers to step 972. If the calculated address is not equal to null, the local processor 122 transfers control to step 970 which sets the SG_TRANSFER flag to TRUE. Control transfers to step 972 wherein the local processor 122 determines whether additional data is contained within a current block. It should be noted that an initial null address may be used to indicate a block wherein the data does not occupy the entire block and is offset by a given number of bytes from the beginning of the block.

If the local processor 122 determines in step 972 that additional data is within the command block, control transfers to step 974 where the local processor 122 sets the address offset from the beginning of the block data and the new data size and sets SG_TRANSFER equal to TRUE. Control transfers to step 978. If the local processor 122 determines in step 972 that there is no additional data in the block, control transfers to step 976 which sets the pointer to the next descriptor block. Control transfers to step 978 wherein the local processor determines if the SG_TRANSFER flag is equal to TRUE. If equal to TRUE, control transfers to step 980 in which the local processor 122 determines whether the operation is to be an EISA read or write. It should be noted that an EISA read is viewed by the disk array controller as a write operation, whereas an EISA write is viewed by the disk array controller as a read operation. If the command is an EISA read, control transfers to step 982 which calls function BMIC_READ to transfer the information required and sets the directional bit as outgoing.

If the local processor determines in step 980 that the command is an ESIA write, control transfers to step 984 which calls BMIC_READ to transfer the information to the host and sets the directional bit as incoming. Following step 982 control transfers to step 986. Following step 984, control transfers to step 986. In step 986 the local processor 122 updates the number of blocks which have been transferred to the host and the number of remaining blocks to be transferred. Control transfers to step 988 which updates the transfer buffer address by one block size (512 bytes). Control transfers to step 990 in which the local processor 122 determines whether more descriptor blocks are to be transferred to or from the host. If more descriptor blocks are to be transferred, control is transferred to step 964 and the local processor 122 loops until the transfer is complete. If no more blocks are to be transferred, control transfers to step 992 which terminates operation of SG_BLOCK and control is transferred back to the local processor 122 operating system.

7. BMIC Data Transfer

Figure 17A:
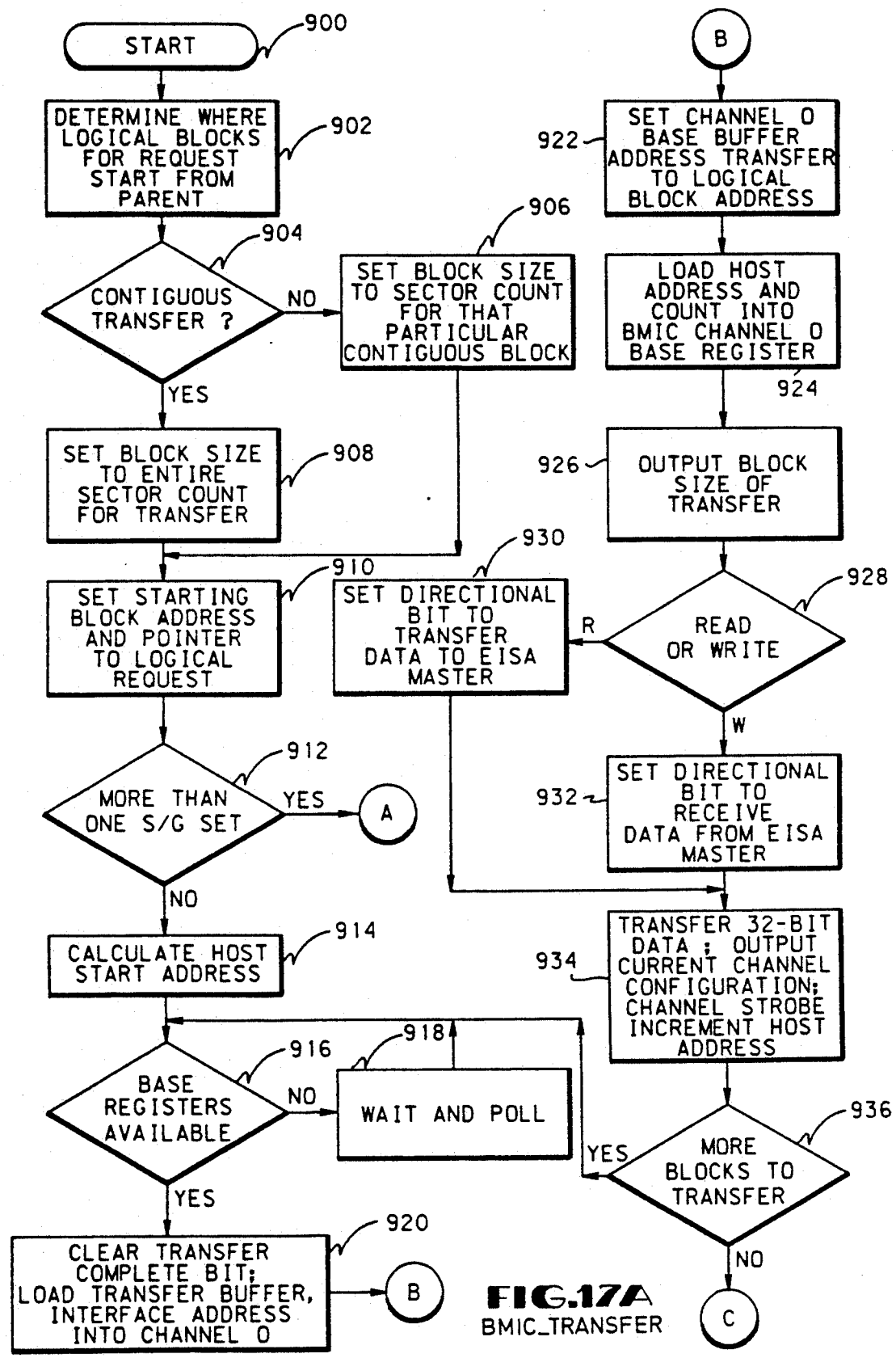
FIGS. 17A and 17B are flow diagrams of the manner in which the current invention manages transfers across the EISA bus.
Figure 17B:
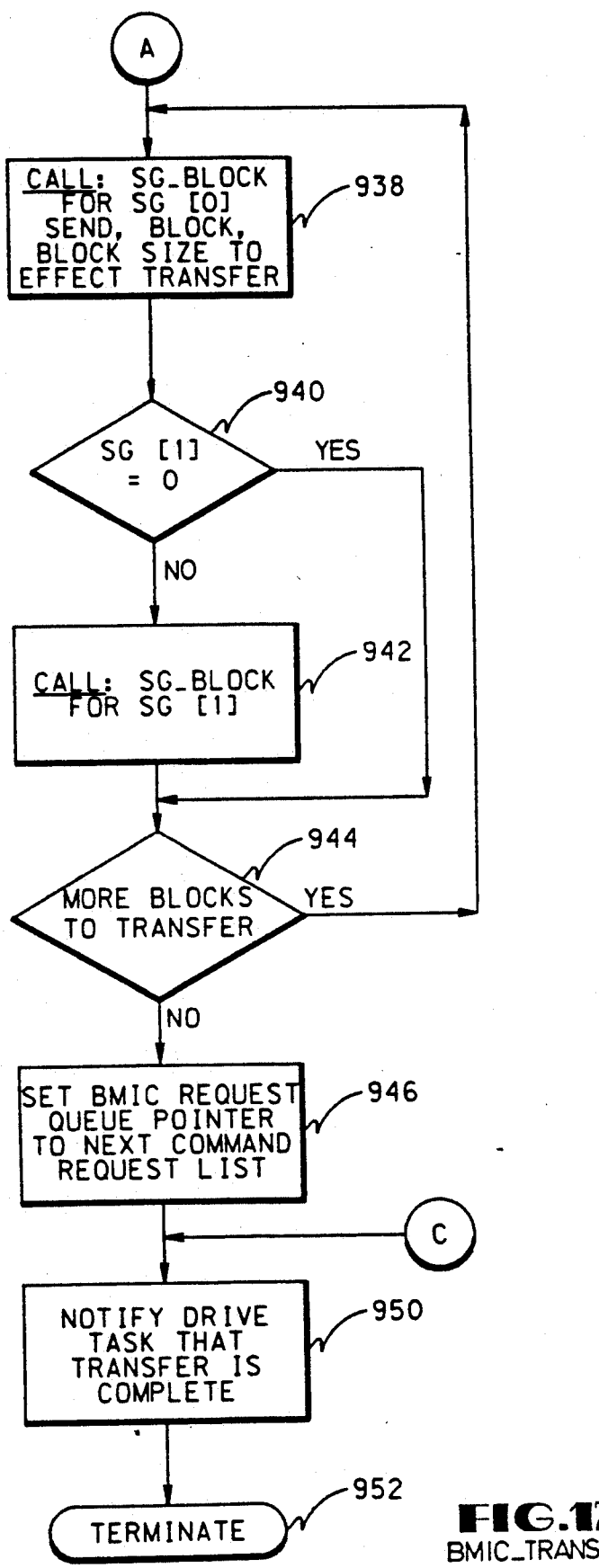

FIGS. 17A and 17B are flow diagrams of the BMIC_TRANSFER function which is utilized to transfer data from the disk array controller through the BMIC to the calling device whether host or some other bus master device. The function is called at step 900. Control transfers to step 902 wherein the local processor determines where the logical blocks for the request start using the parent logical pointer. Control transfers to step 904, wherein the local processor 122 determines whether the logical blocks to be transferred are in a contiguous group. If the logical blocks are not in a contiguous group, control transfers to step 906 which sets the block size to the sector count for that particular contiguous block. Control transfers to step 910. If the local processor 122 determines in step 904 that the blocks to be transferred are in a contiguous group, control transfers to step 908. In step 908, the local processor 122 sets the block size equal to the entire sector count for the transfer. Control transfers to step 910 wherein the local processor 122 obtains the starting block address and pointer to the logical request. Control transfers to step 912 wherein the local processor 122 determines whether the logical request has only one scatter/gather array. If the logical request has more than one scatter/gather array control transfers to step 938. If the logical request has only one scatter/gather array, a high speed data transfer as follows is effected. Control transfers to step 914 in which the local processor 122 calculates the host start address. Control transfers to step 916 wherein the local processor determines whether the base registers are available. If the base registers are not available, control transfers to step 918 wherein the local processor goes into a wait or poll state and loops back through step 916 until the base registers are available. If the base registers are available, control transfers to step 920, wherein the local processor 122 clears the transfer complete bit and loads the transfer buffer interface data into BMIC 188 channel 0. Control transfers to step 922 wherein the local processor 122 sets BMIC 118 channel 0 buffer address equal to the logical block address for the transfer. Control transfers to step 924 in which the local processor 122 loads the host address and count into BMIC 118 channel 0 base registers. Control transfers to step 926 wherein the local processor 122 loads the output block size of the transfer into the buffer.

Control transfers to step 928 in which the local processor 122 determines if the transfer is to be a read or write. If the transfer is a read transfer, control transfers to step 930 which sets the directional bit to transfer data to the EISA master (seen as a write from the disk array controller 112). Control transfers to step 934. If the local processor 122 determines in step 928 that the operation is to be a write, control transfers to step 932 which sets the directional bit to receive data from the EISA master (effectively a read for the disk array controller 112). Control transfers to step 934, wherein the local processor initiates transfer of the 32 bit data, outputs the current channel configuration, channel strobe and increments the host address. Control transfers to step 936 in which the local processor 122 determines if there are more blocks to transfer in the command list. If there are more request blocks to be processed, control transfers to step 916 wherein the local processor 122 continues to process all blocks until the command list 200 is completed. If there are no more request blocks 204 to be processed, control transfers to step 950.

If the local processor 122 determines in step 912 that the logical request has more than one scatter/gather descriptor set 208, control transfers to step 938 which calls the SG_BLOCK function which upon sending the block address, block size to the SG_BLOCK function, the present invention sends the 32 bit data, the output current channel configuration, channel strobe and increments host address. Control transfers to step 940 in which the local processor 122 determines if there is a second scatter/gather descriptor set 208 for the current request. This would indicate that address information for the read command may be found in two different areas of system memory. If there is no second scatter/gather descriptor set, control transfers to step 944. If there is a second scatter/gather descriptor set, control transfers to step 942 wherein the block address, block size are sent to function SG_BLOCK and a transfer of 32 bit data, channel configuration, channel strobe are sent to the host device and the host address is incremented. Control transfers to step 944 wherein the local processor 122 determines if there are additional request blocks to be processed. If there are additional request blocks 204 to be processed control is transferred back to step 938 and the function continues to loop until all request blocks 204 have been processed. If the local processor 122 determines in step 944 that there are no further request blocks 204 to be processed control is transferred to step 946 wherein the local processor 122 advances the BMIC request queue pointer to the next command list 200. Control transfers to step 950 in which the local processor 122 notifies the drive task that the transfer has been completed. Control transfers to step 952 which terminates the operation of this function and returns control to the local processor 122 operating system.

8. BMIC Data Transfer Queue

Figure 19:
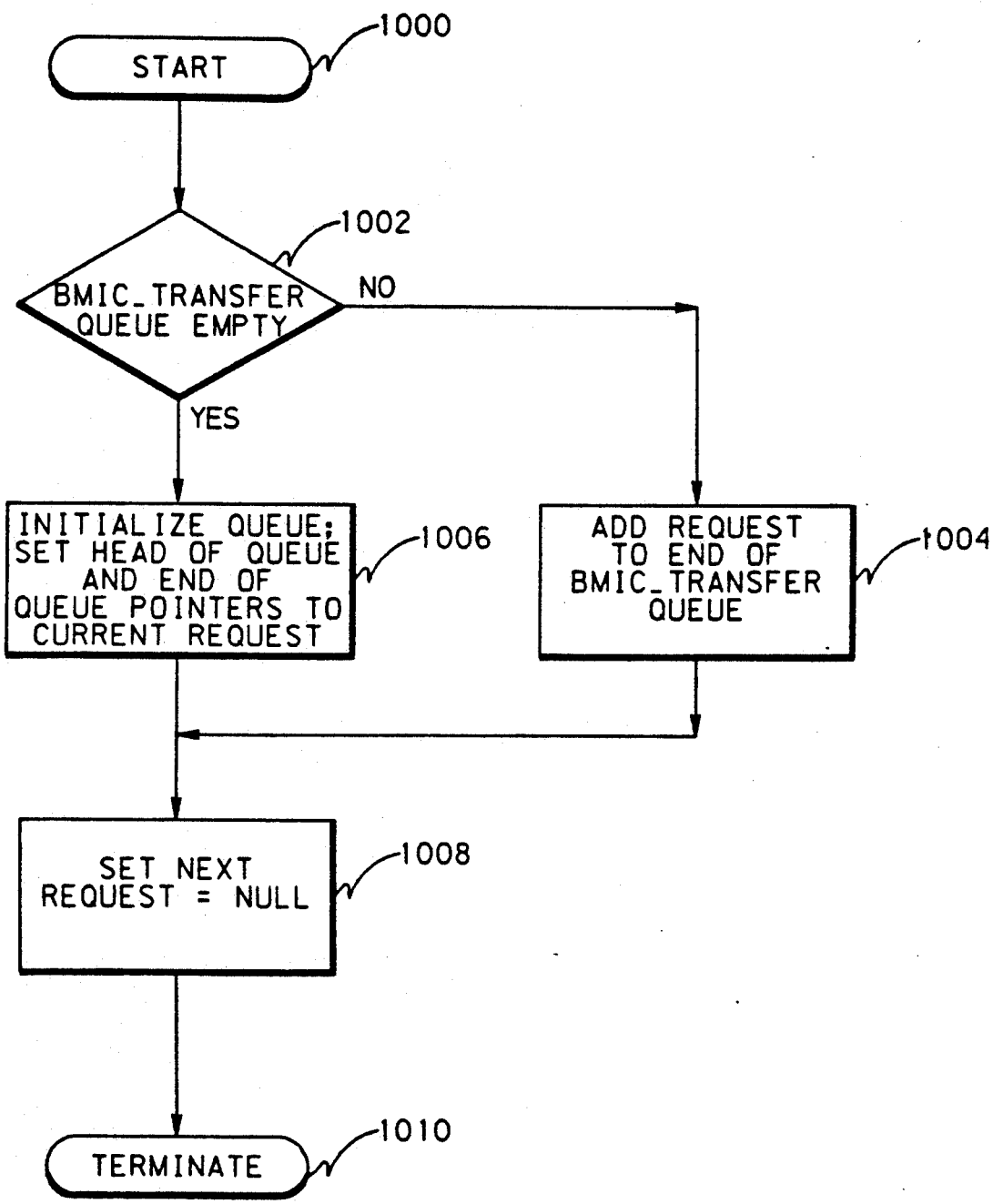
FIG. 19 is a flow diagram of the manner in which the present invention manages a transfer queue.

FIG. 19 is a flow diagram of the BMIC_XFER_QUE function. This function is utilized by the present invention to queue BMIC transfers when there are multiple BMIC transfers being operated upon by the local processor. BMIC_XFER_QUE is called by the calling program in step 1000. Control transfers to step 1002 wherein the local processor 122 determines whether the BMIC_XFER_QUE is empty. If the BMIC_XFER_QUE is not empty, control transfers to step 1004 which adds the request to the end of the BMIC_XFER_QUE. Control transfers to step 1008. If the local processor 122 determines in step 1002 that the BMIC_XFER_QUE is empty, control transfers to step 1006. In step 1006, the local processor 122 initializes the queue, sets the head of the queue and the end of the queue pointers to the current request. Control transfers to step 1008, wherein the local processor 122 sets the next request pointer equal to null. Control transfers to step 1010 which returns control to the calling program.

9. BMIC Data Read

Figure 12:
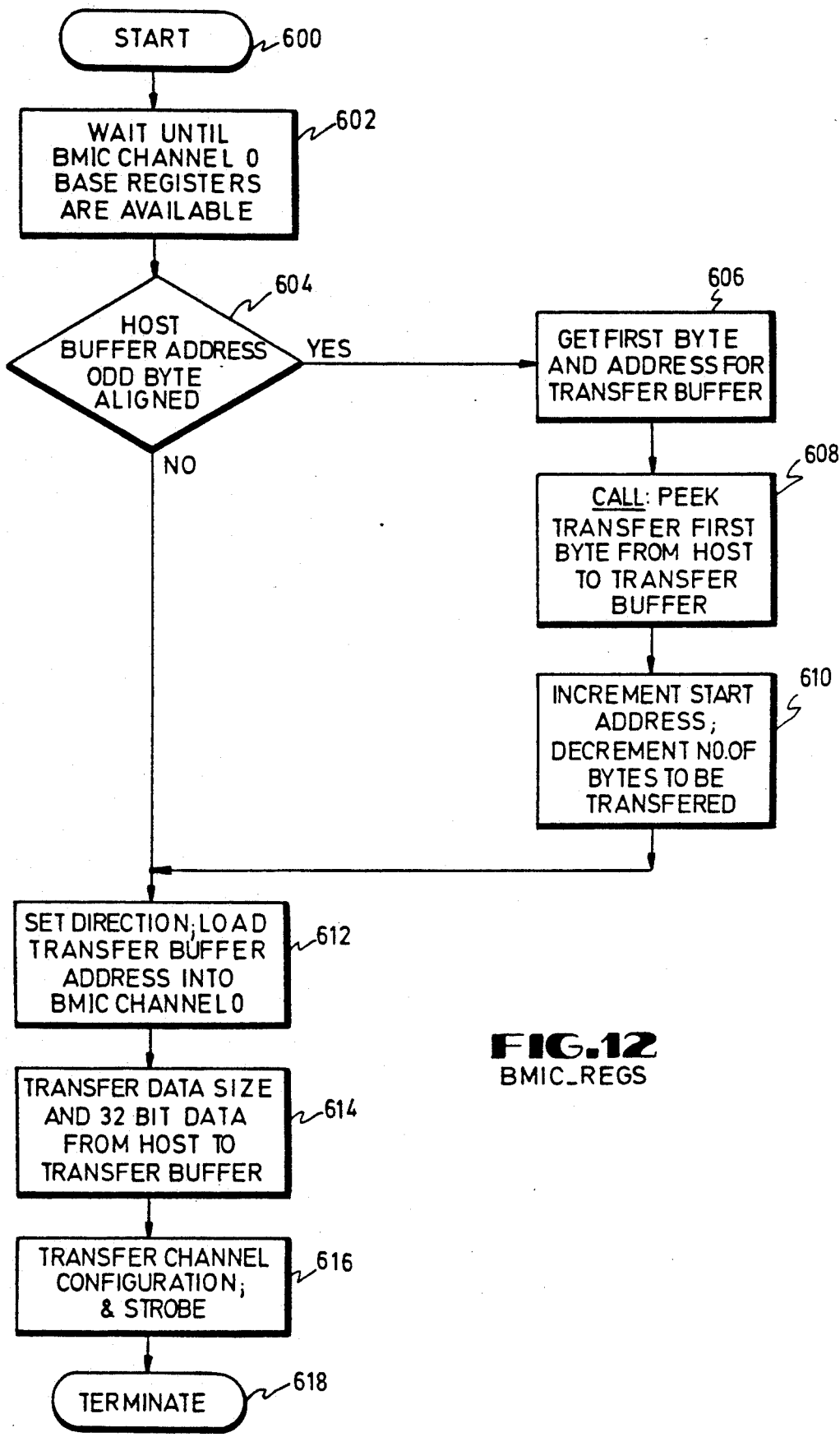
FIG. 12 is a flow diagram of the manner in which the present invention processes a READ command.

FIG. 12 is a flow diagram of the BMIC_READ function which is used by the present invention to read (effectively, a write from the system or device driver) information sent to the disk array controller 112. The BMIC_READ function is called at step 600. Control transfers to step 602 wherein the local processor 122 waits until BMIC channel 0 base registers are all available. Control transfers to step 604 in which the local processor 122 determines whether the host buffer address for the data to be sent to the disk array controller 112 is odd byte aligned. If it is determined that the host buffer address is odd byte aligned, control transfers to step 606 in which the local processor 122 obtains the address and the data contained within the first byte and loads into the transfer buffer. Control transfers to step 608 in which the local processor 122 calls the PEEK function, effectively transferring the first byte from the host to the transfer buffer. Control transfers to 610 in which the local processor 122 increments the start address of the data from the host to the next byte, effectively even aligning the bytes and decrements the number of bytes to be transferred. Control is then transferred to step 612. If in step 604 the local processor 122 determines that the host buffer address is not odd byte aligned, control transfers to step 612. In Step 612 the local processor 122 sets the direction of the transfer and loads the transfer buffer address into BMIC channel 0. Control transfers to step 614 in which the local processor 122 transfers the data size and 32 bit data from the host to the transfer buffer. In step 616 the local processor 122 transfers the channel configuration and channel strobe into the transfer channel buffer. Control transfers to step 618 which completes the loading of the transfer channel interface information in the BMIC 118. The BMIC 118 then initiates the transfer of the sector data with the transfer channel controller 124, which results in the data being automatically transferred from host memory to the transfer buffer memory 130 for later transfer to the disk array. Control returns to the local processor 122 operating system.

10. BMIC Data Write

Figure 13:
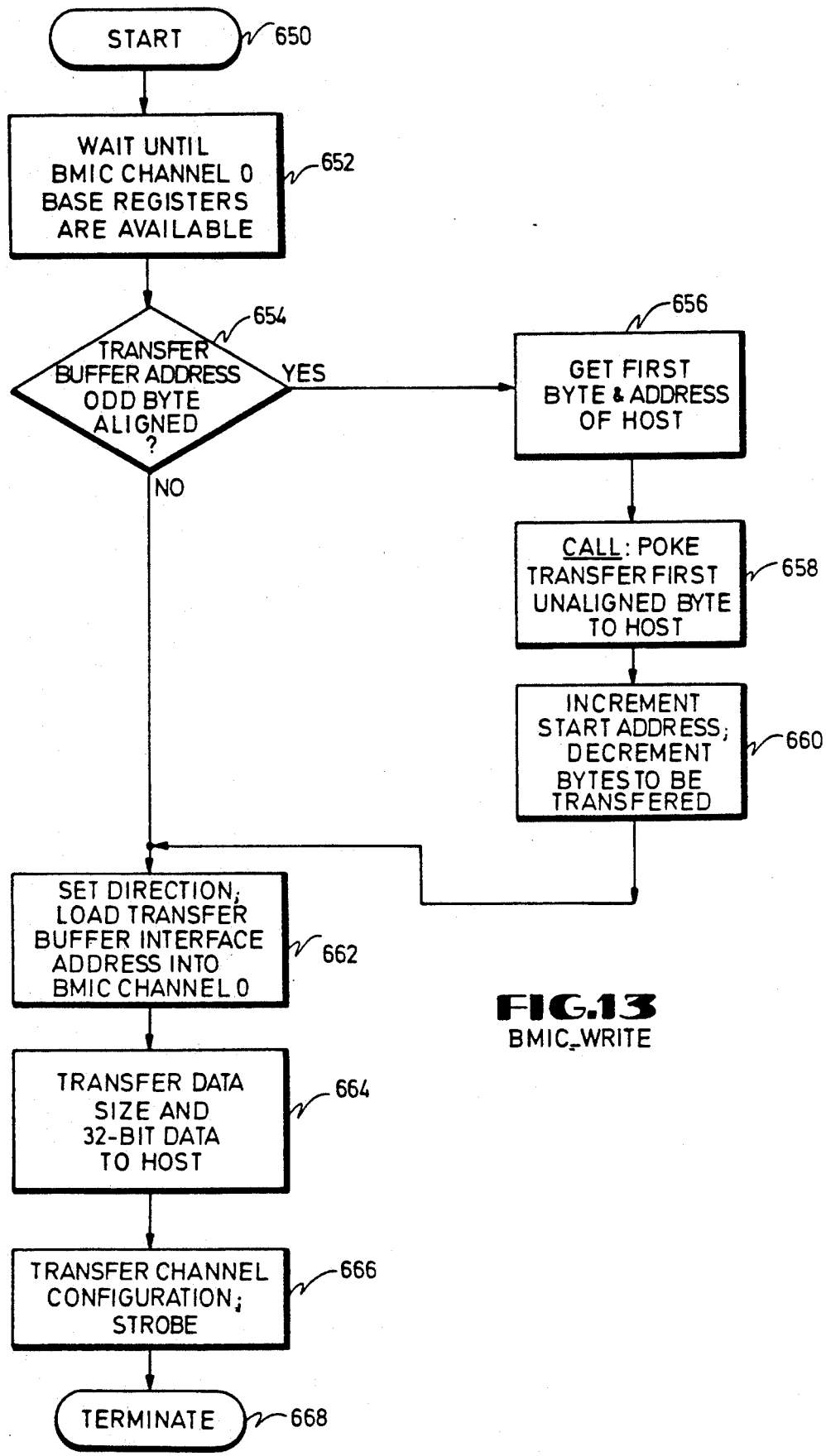
FIG. 13 is a flow diagram of the manner in which the present invention processes a WRITE command.

FIG. 13 is a flow diagram of the function BMIC_WRITE which is used by the present invention to load the transfer buffer interface write commands from the disk array controller 112 (effectively a READ for the system processor). BMIC_WRITE is called in step 650. Control transfers to step 652 in which the local processor 122 waits until BMIC channel 0 base registers are available. Control transfers to step 654 wherein the local processor 122 determines whether the transfer buffer address is odd byte aligned. If it is determined that the transfer buffer address from the disk array is odd byte aligned, control transfers to step 656 in which the local processor 122 retrieves the first byte and address of the data from the disk array. Control transfers to step 658 in which the local processor 122 calls function POKE to transfer the first unaligned byte to the host. Control transfers to step 660 where the local processor 122 increments the start address and decrements the number of bytes to be transferred. Control transfers to step 662. If in step 654 it is determined that the transfer buffer address is not odd-byte aligned, control transfers to step 662. In step 662, the local processor 122 sets the direction of the transfer and loads the transfer buffer interface address into BMIC channel 0. Control transfers to step 664 in which the local processor 122 transfers the data size and 32 bit data to the host. Control transfers to 666 in which the local processor 122 sends the transfer channel configuration and channel strobe to the transfer channel buffer. Data transfer from the transfer buffer memory 130 is performed in a similar fashion to the transfer of BMIC Data Read. Control transfers to step 668 which the terminates the BMIC__ WRITE function and returns control of the system to the local processor 122 operating system.

11. Peek Mode Data Transfer

Figure 20:
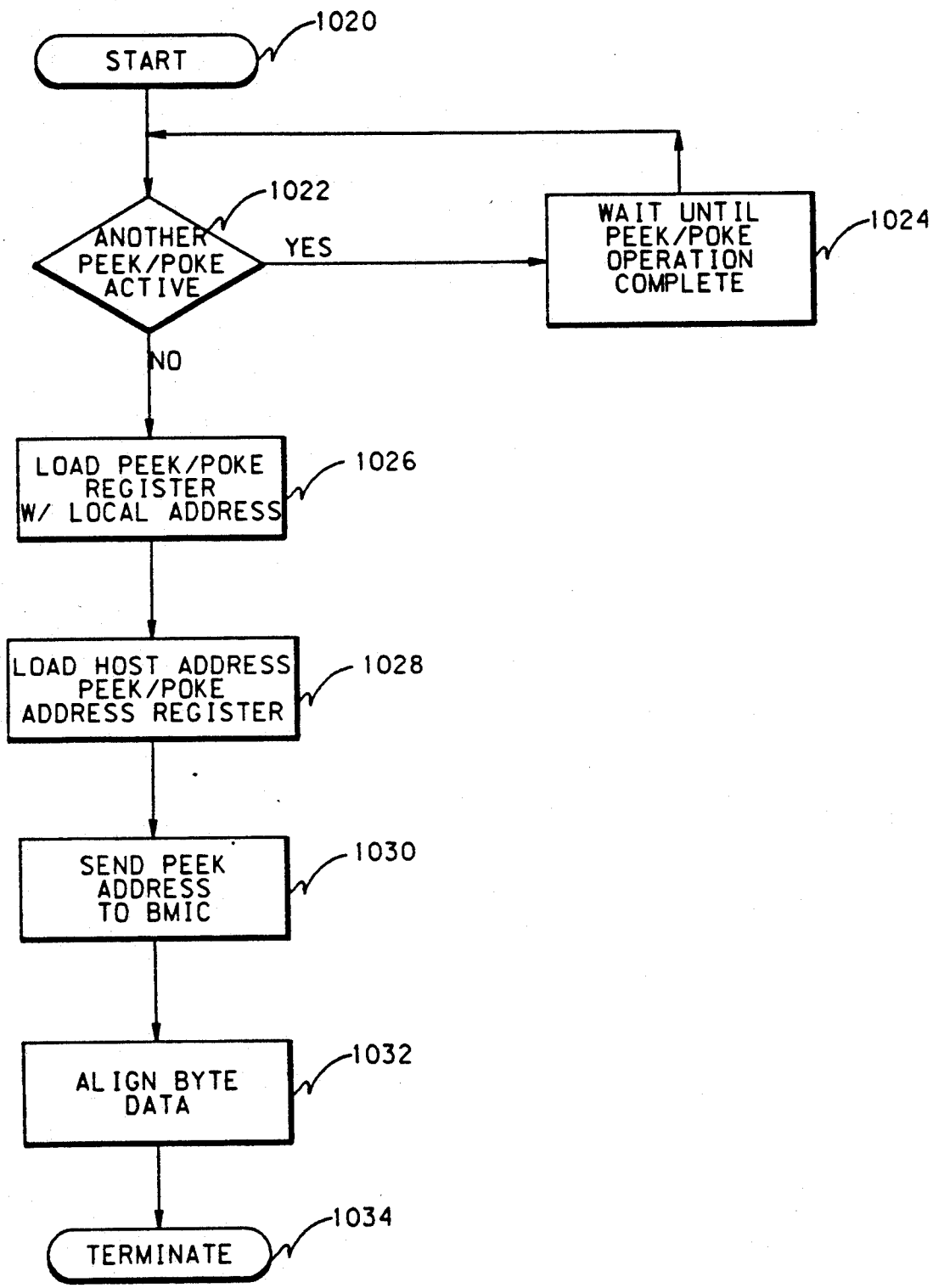
FIG. 20 is a flow diagram of the manner in which the present invention handles a PEEK data transfer.

FIG. 20 is a flow diagram of the PEEK function wherein the local processor 122 reads a single byte of memory from the host processor or other device driver. The PEEK function is called at step 1020. Control transfers to step 1022 wherein the local processor 122 determines if another PEEK/POKE cycle is active. If the local processor 122 determines that another PEEK/POKE cycle is active, control transfers to step 1024 wherein the local processor 122 waits until the PEEK/POKE operation currently active is complete. Control transfers back to step 1022 which again interrogates whether another PEEK/POKE cycle is active. If no other PEEK/POKE cycle is active, control transfers to step 1026 wherein the local processor 122 loads the PEEK/POKE register with the local address into which the data is to be read. Control transfers to step 1028 wherein the local processor 122 loads the host address into the PEEK/POKE register. The host address represents the address in system memory 58 or device driver memory wherein the data is to be obtained from. Control transfers to step 1030 wherein the local processor 122 sends the PEEK address to the BMIC 118 which performs the PEEK cycle to read the data from the host or device driver memory. Control transfers to step 1032 wherein the data read from host or device driver memory is aligned for the local processor 122. Control transfers to step 1034 which returns control of the local processor 122 to the operating system.

12. POKE Mode Data Transfer

Figure 21:
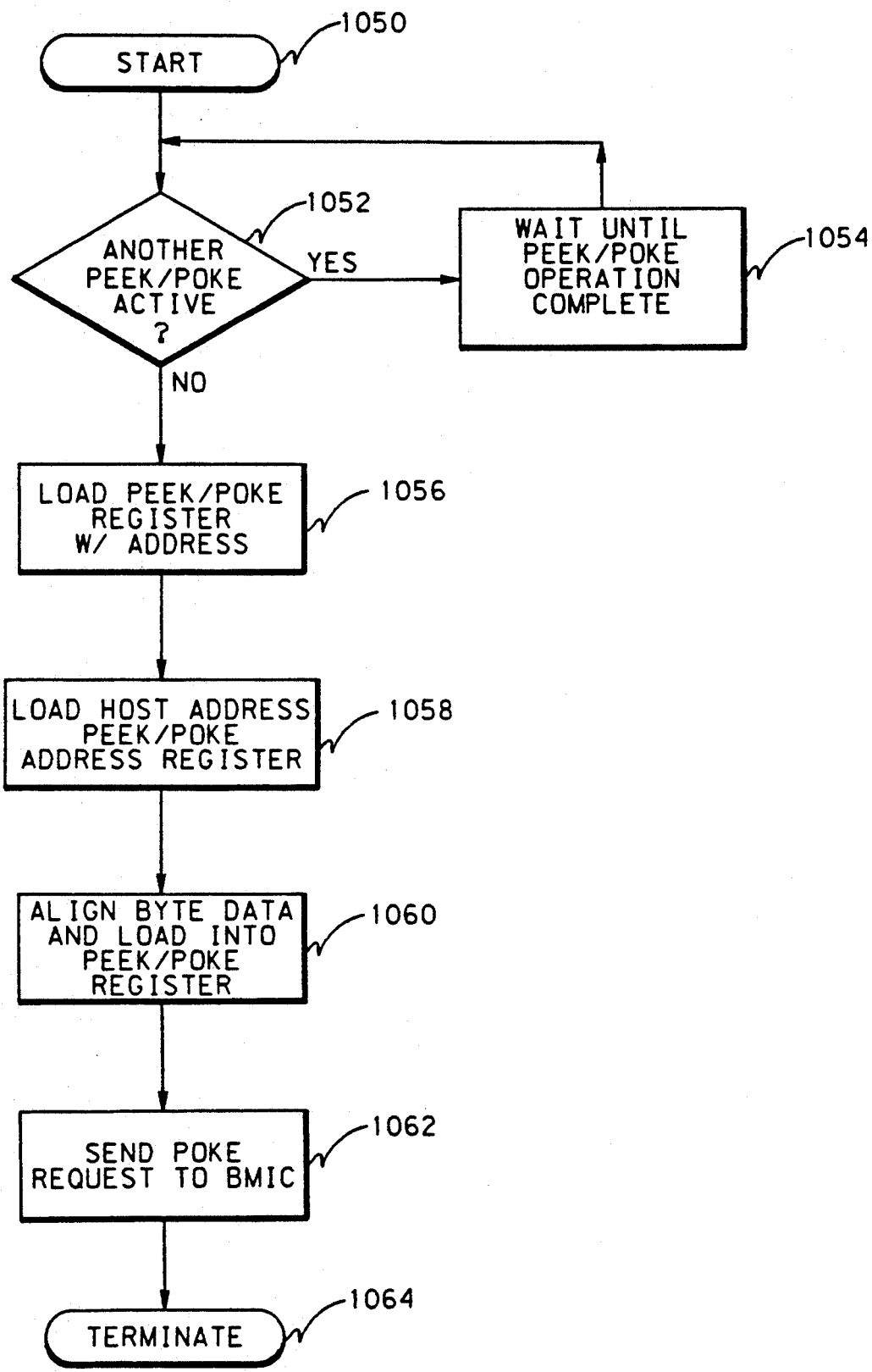
FIG. 21 is a flow diagram of the manner in which the present invention manages a POKE data transfer.

FIG. 21 is a flow diagram of the POKE function which is used by the local processor 122 to send a byte of information to the host or device driver memory. The poke function is called from step 1050. Control transfers to step 1052 in which the local processor 122 determines whether another PEEK/POKE cycle is active. If another PEEK/POKE cycle is active, control transfers to step 1054 wherein the local processor 122 waits until the current PEEK/POKE operation cycle is complete. Control transfers to step 1052 wherein the local processor 122 again interrogates whether another PEEK/POKE cycle is active. If no other PEEK/-POKE cycle is active, control transfers to step 1056 wherein the local processor 122 loads the PEEK/-POKE register with the local address of the information to be sent to the host or device driver memory. Control transfers to step 1058 where the local processor 122 loads the host address into the PEEK/POKE register. The host address represents the target address to which the data is to be sent from the local processor. Control transfers to step 1060 where in the BMIC 118 aligns the byte data the proper byte lanes and loads into the PEEK/POKE register. Control transfers to step 1062 and the local processor 122 sends the POKE request to the BMIC which acts upon the POKE request sending the data to the host or device driver memory. Control transfers to step 1064 which terminates the operation of the POKE function and returns control to the local processor 122 to the operating system.

The next set of modules are directed toward the method by which the present invention notifies the computer system C of command completion or error. The BMIC__OUR module is the main module by which the disk controller 112 notifies the computer system of command completion state. The POST__NOTIFICATION module is utilized to program the BMIC to carry out notification called for in BMIC__OUT. The NOTIFICATION__CLEAR module is utilized when the host system has been unable to keep up with the completion notifications. The notifications are queued until the notification channel is cleared by the host system.

13. Command Completion Notification

Figure 10:
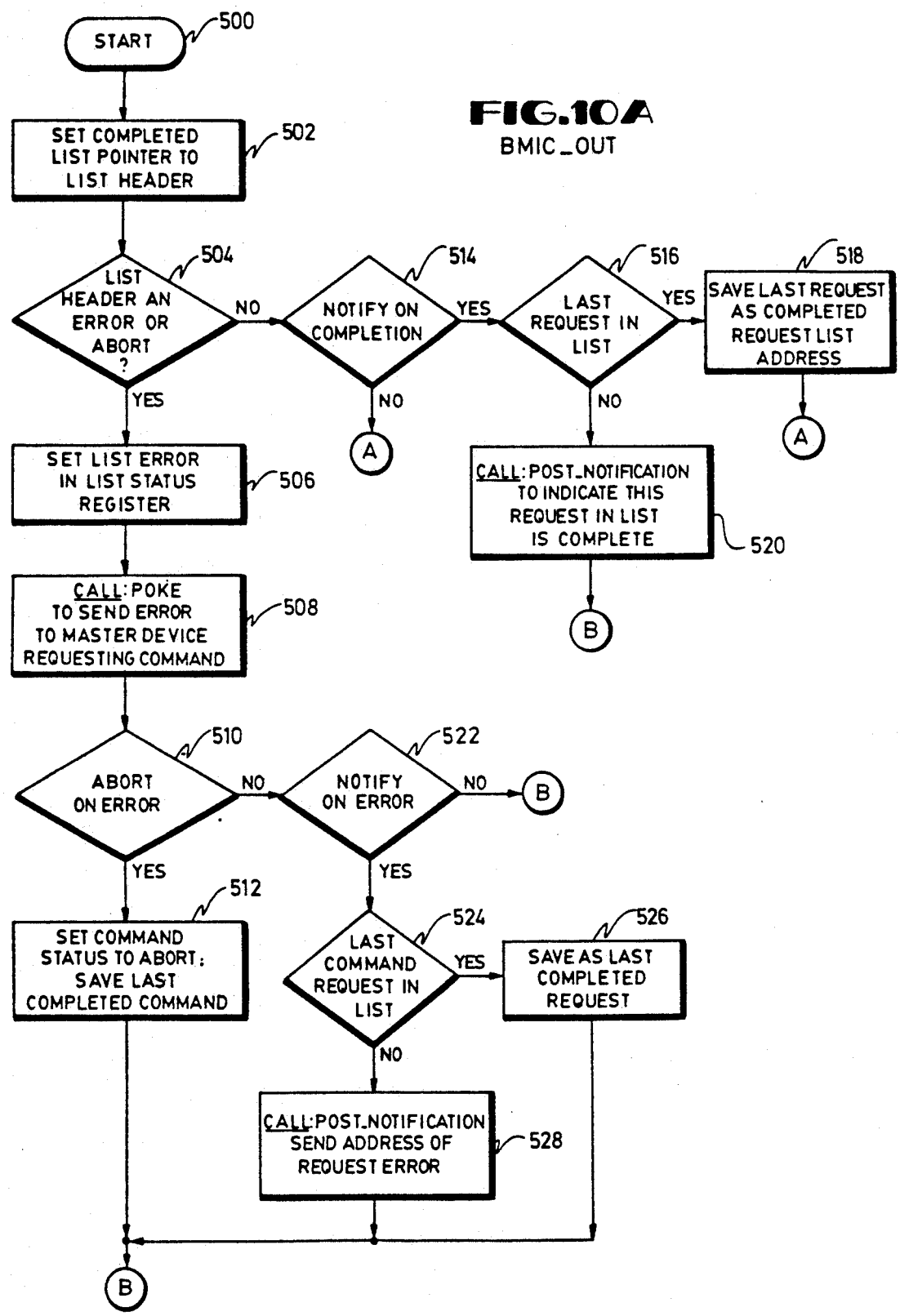
FIG. 10A and 10B are flow diagrams of the specific manner in which the disk controller notifies the host processor or device driver that the command has completed.

FIGS. 10A and 10B are flow diagrams of the function BMIC__OUT, which is used by the present invention to notify the system processor that the command list has been completed or an error has occurred. The process of notifying the system processor 20 that a command has completed is generally described in FIG. 7. FIGS. 10A and 10B specify the method followed by the present invention. Operation of BMIC__OUT begins with a system called by the local processor 122 in step 500. Control transfers to step 502 in which the local processor 122 sets a completed list pointer to the list header. Control transfers to step 504 where the local processor 122 determines whether the command list indicates a command list error or abort. If list status indicates error or abort, control transfers to step 506 in which the local processor 122 sets the list error in the list status register. Control transfers to step 508 where the local processor 122 calls subroutine POKE to send the error to the master device which sent the command. Control transfers to step 510 in which the local processor 122 determines whether the control flag set in the command list header calls for an abort on error. If an abort on error is called for, control is transferred to step 512 which sets the command status to abort and saves the last completed command. Control is then transferred to step 536. If in step 510 it is determined that the control flag has not been set on abort on error, control transfers to step 522 in which the local processor 122 determines whether the control flag is set to a notify on error. If not set to notify on error, control transfers to step 536. If set to notify on error, control transfers to step 524 in which the local processor 122 determines if the command which caused the error was the last command request in the list. If true, control transfers to step 526 where the local processor saves the last completed command request. Control transfers to step 526. If the command request causing the error was not the last request in the list, control transfers to step 528 which calls function POST__NOTIFICATION, which sends the address of the command request causing the error. Control transfers to step 536.

If in step 504, the list header does not have an error or an abort, control transfers to step 514 in which the local processor 122 determines whether the control flag in the command list header is set to notify upon completion. If set to notify upon completion, control transfers to step 516 in which the local processor 122 determines whether the completed request is the last command request in the command list 200. If the command request 204 is the last request in the command list 200, control transfers to step 518 in which the local processor 122 saves the last request as a completed command request address. Control transfers to step 530. If in step 516 it is determined that the request is not the last command request in the command list, control transfers to step 520 and the local processor 122 calls function POST_NOTIFICATION to indicate that the particular request in the list has been completed. Control transfers to step 536. If in step 514 it is determined from the command list header control flags that the request is not to notify upon completion, control transfers to step 530. In step 530, the local processor 122 determines whether the command list is complete. If the command list 200 is complete, control transfers to step 532 and the local processor 122 sets the list status in the command list header to list complete. Control transfers to step 534 where the local processor 122 calls function POST_NOTIFICATION to send the list complete status to the requesting device. Control transfers to step 536 which frees local memory allocated to the command list headers, command list request and the command list scatter/gather descriptors arrays. Control transfers to step 538 which returns control of the the local processor 122 to the real-time system.

14. Command Notification

Figure 25:
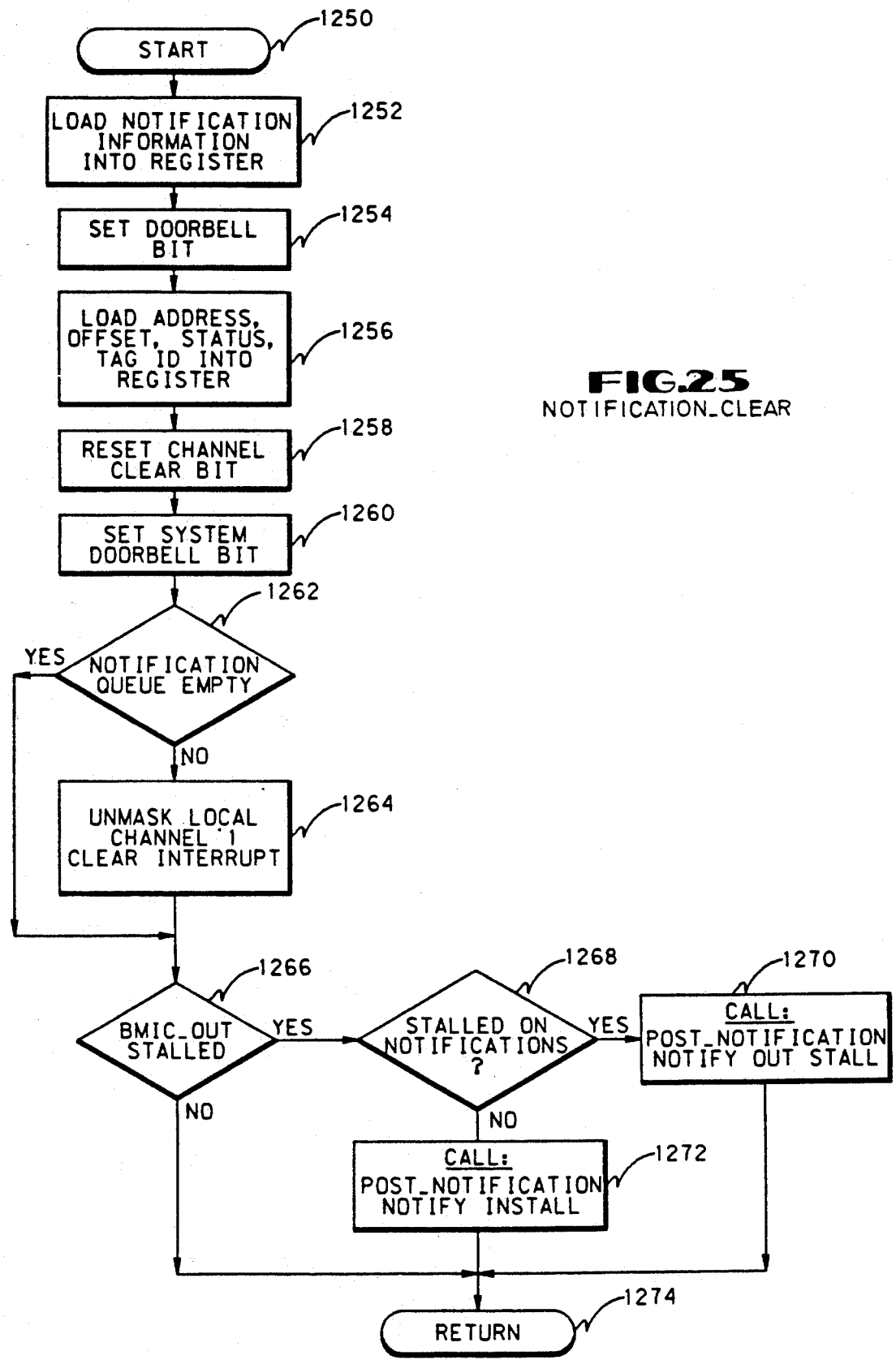
FIG. 25 is a flow diagram of the manner in which the present invention may alternately use to notify the completion of a command.

FIG. 25 is a flow diagram for the function NOTIFICATION_CLEAR. NOTIFICATION_CLEAR is called in step 1250. Control transfers to step 1252 where the local processor 122 loads the notification information into the channel 1 registers. Control transfers to step 1254 wherein the local processor 122 sets the system doorbell bit. Control transfers to step 1256 where the local processor 122 loads the address, offset, status and tag I.D. into the transfer registers. Control transfers to step 1258 in which the local processor 122 resets the channel clear bit. Control transfers to step 1260, where the local processor 122 sets the system doorbell bit. Control transfers to step 1262 where the local processor 122 determines whether the notification queue is empty. If not empty, control transfers to step 1264 which unmasks the local channel 1 clear interrupt bit. Control transfers to step 1266. If it is determined in step 1262 that the notification queue is empty, control transfers to step 1266. In step 1266, the local processor 122 determines whether the BMIC_OUT function is stalled. If stalled, control transfers to step 1268 in which the local processor 122 determines whether the BMIC_OUT is stalled on notifications. If stalled on notifications, control is transferred to step 1270 in which the local processor 122 calls functions POST_NOTIFICATION to queue notifications to the system. Further, a NOTIFY_OUT stall flag is set. Control transfers to step 1274 which returns control to the calling program. If the BMIC_OUT is not stalled on notifications, control is transferred to step 1272 which calls function POST_NOTIFICATION and sets a NOTIFY_IN stall flag. Control transfers to step 1274. If step 1266 determines that the BMIC_OUT has not stalled, control is transferred to step 1274 which returns to the calling program.

15. Command Completion Post Notification

Figure 24:
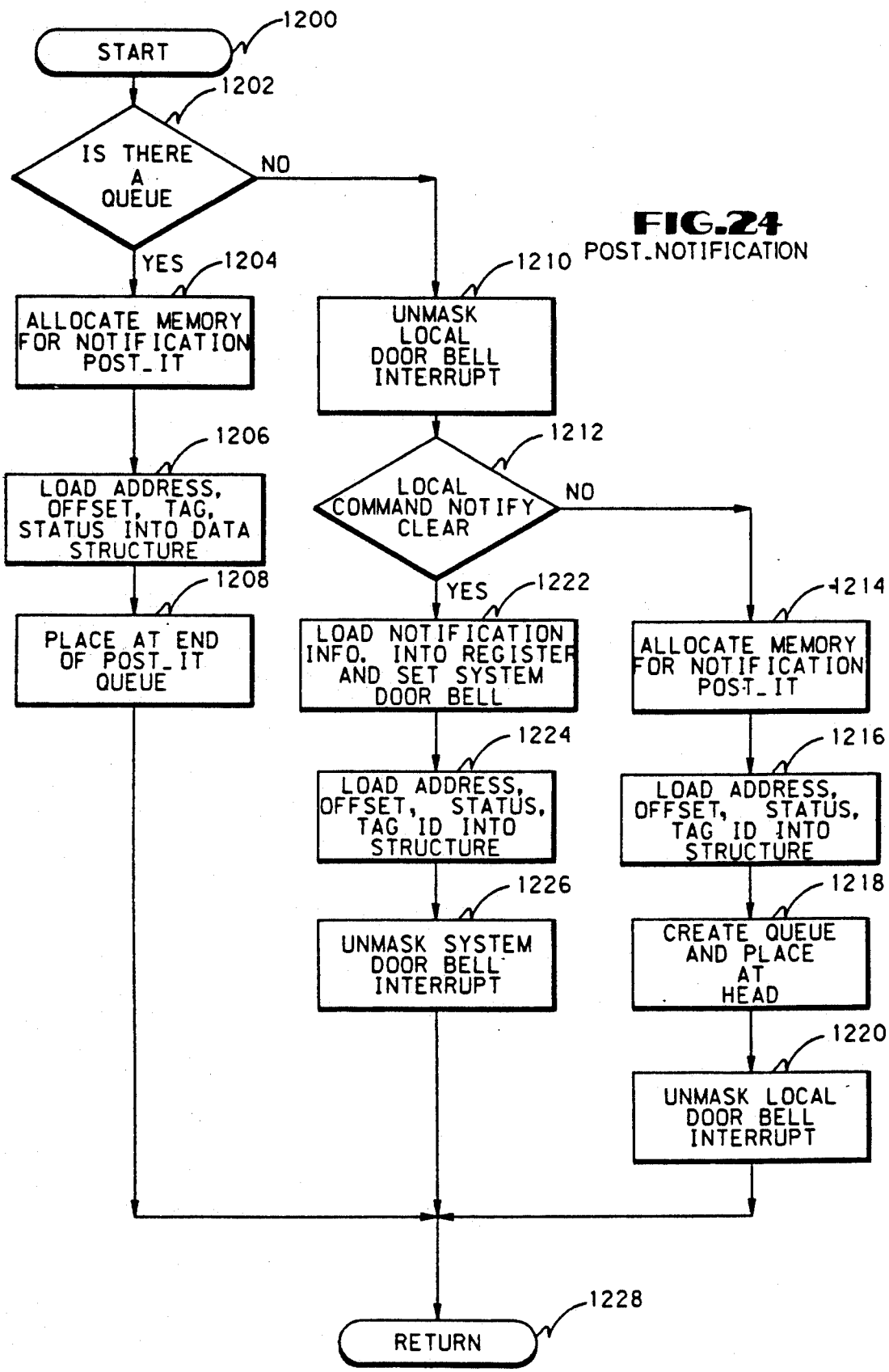
FIG. 24 is a flow diagram of the manner in which the present invention manages notification of completion or errors in the execution of a request.

FIG. 24 is a flow diagram of the POST_NOTIFICATION function which is used to notify as to completion of a command list. POST_NOTIFICATION is called in step 1200. Control transfers to step 1202 where the local processor 122 determines whether there is a notification ring queue. Control transfers to step 1204 if there is a queue. The local processor allocates memory for the notification data structure in step 1204. Control transfers to step 1206 where the local processor 122 loads the address, offset, tag I.D. and status into the notification data structure. Control transfers to step 1208 which places the notification data structure at the end of the POSTIT_QUEUE. Control transfers to step 1228. If it is determined that there is no queue in step 1202, control transfers to step 1210 in which the local processor 122 unmasks the local doorbell interrupt. Control transfers to step 1212 where the local processor 122 determines if the local command notify bit is clear. If the local command notify clear bit is not clear, control transfers to step 1214 where the local processor 122 allocates memory for the notification POSTIT. Control transfers to step 1216 where the local processor 122 loads the address, offset, status and tag I.D. into the data structure. Control transfers to step 1218 which creates a ring queue and places the notification structure at the head of the queue. Control transfers to step 1220 where the local processor unmasks the local doorbell interrupt. Control transfers to step 1228. If in step 1212 the local processor 122 determines that the local command notify clear bit is set, control transfers to step 1222 where the local processor 122 loads notification information into registers and sets the system doorbell. Control transfers to step 1224 where the local processor 122 loads the address, offset, status and tag I.D. information into the transfer buffers. Control transfers to step 1226 in which the local processor 122 unmasks the system doorbell interrupt. Control then transfers to step 1228 where control is returned as a calling program.

The next set of modules are utilized by the present invention to carry out non-I/O disk commands, such as setting and checking the configuration of the disk array. The SET_CONFIGURATION module is utilized to create a configuration for the entire array. The SENSE_CONFIGURATION module is utilized to determine what the existing configuration is within the array. The SET_CONFIGURATION command is issued by the EISA CMOS upon completion of a logical unit by the EISA configuration routine. The BMIC_SENSE_UNIT module is used to determine the status of a specified logical unit to the host system. The IDENTIFY module is used to identify either the controller of the particular type of disk within the array based upon the logical command issued. The CONFIGURATION_VALID module is used to determine whether the existing configuration for the disk array is valid for the controller and overall system configuration.

16. Configure Logical Unit

Figure 14A:
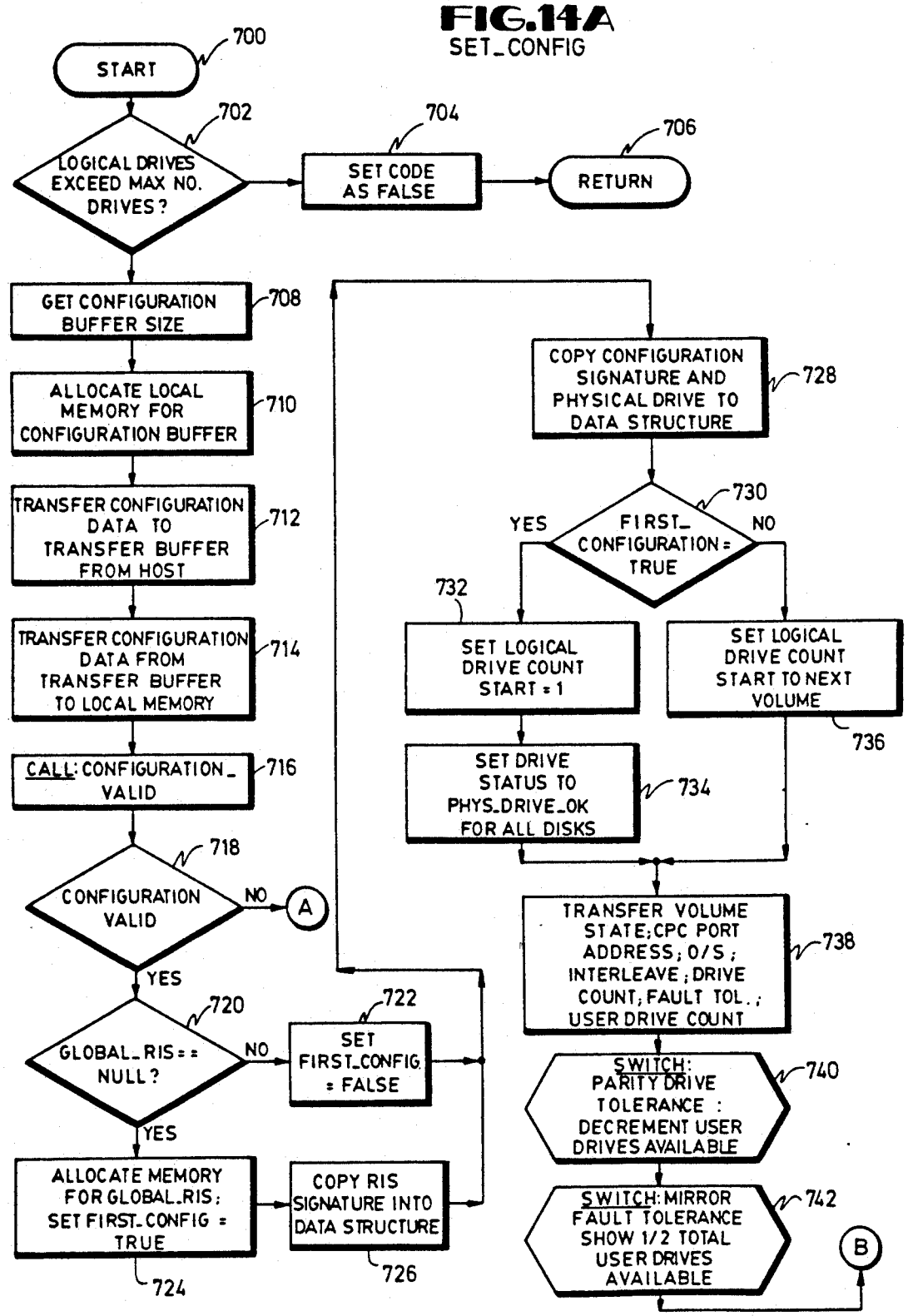
FIGS. 14A and 14B are flow diagrams of the manner in which the present invention sets the configuration for the disk array.
Figure 14:
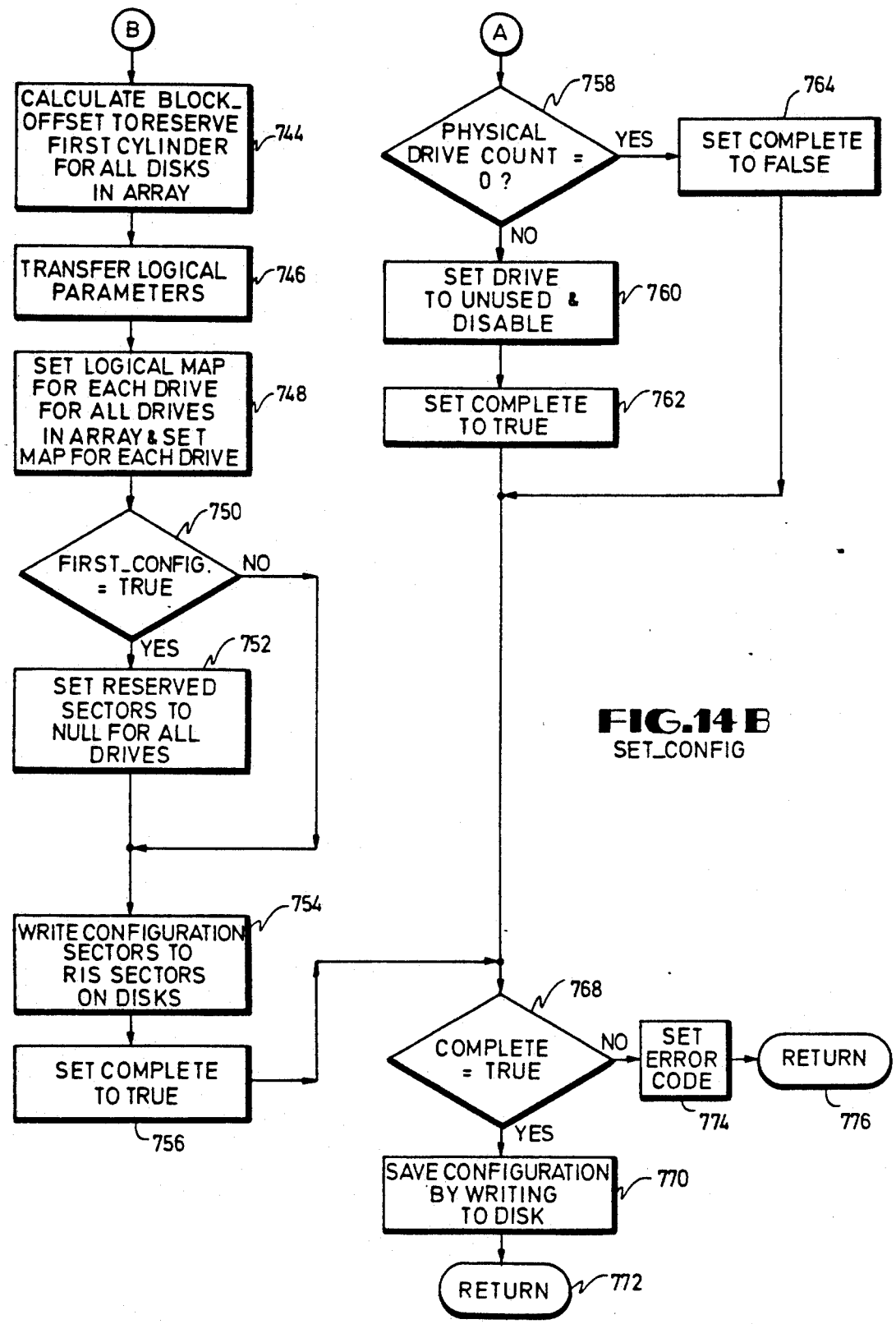

FIGS. 14A and 14B are flow diagrams of the SET_CONFIGURATION function. The set configuration function is used to initialize a logical unit by the local processor 122 and is generally run when the disk array is first initialized or when additional and/or replacement disks are added to the disk array drive system. SET_CONFIGURATION is called in step 700 by the local processor 122. Control transfers to step 702 in which the local processor 122 determines whether the number of logical drives called for in the command exceed the maximum number logical drives for the system. If the logical drives exceed the maximum number, control transfers to step 704 in which the local processor 122 sets a completion code as FALSE and returns control of the system to the local processor 122 in step 706. If in step 702 it is determined that the number of logical drives does not exceed the maximum number of drives permitted, control transfers to step 708 wherein the local processor determines the configuration buffer size. Control transfers to step 710 where the local processor 122 allocates local memory for the configuration buffer. Control transfers to step 712 in which the local processor 122 transfers the configuration data from the host to the transfer buffer interface. Control transfers to step 714 in which the local processor 122 transfers the configuration data from the transfer buffer into local memory. Control transfers to step 716 in which the local processor 122 calls function CONFIGURATION_VALID which will return a valid or a nonvalid return code. Control transfers to step 718 where the local processor 122 determines whether the return code is valid. If not valid, control transfers to step 758. If the return code is valid, control transfers to step 720 in which the local processor 122 determines whether the global reserved information (RIS) sectors are equal to a null value. If not null, the disk array global RIS information indicates that a prior configuration existed and the FIRST CONFIG flag is set equal to FALSE in step 722. Control transfers to step 728. If the GLOBAL_RIS value is equal to null, this indicates that there has been no prior configuration of the disk array. Control is then transferred to step 724 which allocates local memory for a GLOBAL_RIS structure and sets the FIRST_CONFIG flag equal to TRUE. Control transfers to step 726 which copies the RIS signature from the host to the local data structure. Control transfers to step 728. In step 728 the local processor copies the configuration signature and physical drive data to the local data structure for the global RIS. Control transfer to step 730. If the FIRST_CONFIG flag is set to TRUE, control transfers to step 732, wherein the local processor 122 reads all logical drives. Control transfers to step 734 which sets the drive status for all drives to o.k. and available. Control transfers to step 738. If in step 738 it is determined that the FIRST_CONFIG flag is FALSE, control transfers to step 736, in which the local processor 122 sets the logical drive to start at the next available or unused volume. Control transfers to step 738. In step 738 the local processor 122 loads the transfer volume, CPC port address, operating system, interleave scheme, drive count, fault tolerance and user drive count all of which comprises information relating to the physical configuration of the logical unit. Control transfers to step 740 and 742 wherein the local processor 122 reads the fault tolerance flag to determine how to set the number of drives available. In step 740, if parity drive tolerance has been set, the local processor 122 will indicate that drives 3 and 7 are set for parity drive tolerance and the drives are no longer available for use. If fault tolerance has been set to mirror fault tolerance, step 742 the local processor 122 decreases the number of user drives available indicating that there are total of four user drives available as opposed to eight, or one half the available number of drives. Control transfers to step 744, in which the local processor 122 calculates the block offset to reserve the first cylinder for all disk in the array for the eventual writing of all RIS information to this first cylinder. Control transfers to step 746 in which the local processor transfers all disk logical parameters to the transfer interface buffer. Control transfers to step 748 where the local processor 122 builds a logical map for each drive and for all drives in the array. Control is transferred to step 750 in which the local processor 122 determines if FIRST_CONFIG flag is equal to TRUE. If not equal to TRUE control transfers to step 754.

If step 750 determines that the FIRST_CONFIG flag is equal to TRUE control transfers to step 752 in which the local processor 122 sets RIS sectors to null for all drives in the disk array, pending writing of the RIS structure to the cylinder reserved in step 744. Control transfers to step 754 in which the local processor writes the configuration sectors to the RIS sectors on disk. Control transfers to step 756 where the local processor 122 sets a set configuration complete flag equal to TRUE. Control transfers to step 768.

If in step 718 it is determined that the configuration is not valid, control transfers to step 758. If the physical drive count is equal to 0, control transfers to step 764, in which the local processor 122 sets the SET_CONFIGURATION complete flag equal to false. Control transfers to step 768. If in step 758 it is determined that the physical drive count is not equal to 0, control transfers to step 760 which sets the drives equal to unused and disabled. Control transfers to step 762 which sets the set configuration complete flag equal to true. Control transfers to step 768. If the SET_CONFIGURATION complete flag is equal to TRUE, control transfers to step 770 in which the local processor 122 saves the entire configuration into the RIS sectors on all disks. Control transfers to step 772 which returns control of this local processor back to the operating system. If it is determined that the SET_CONFIGURATION complete flag is not equal to TRUE, control transfers to step 774 in which the local processor sets an error code and returns control of the local processor in step 776.

17. Sense Logical Unit Configuration

Figure 15:
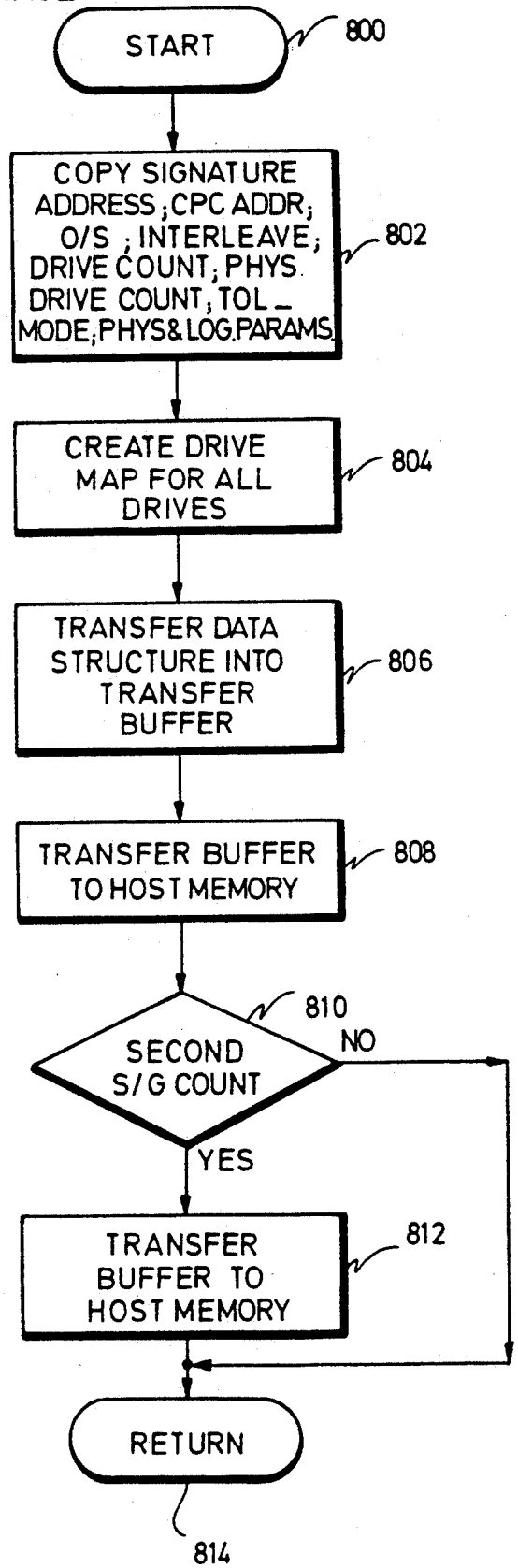
FIG. 15 is a flow diagram of the manner in which the present invention determines the configuration for disk array.

FIG. 15 is a flow diagram of the SENSE_CONFIGURATION_UNIT function wherein the disk array controller 112 identifies the type of logical unit to the calling device in response to command issued by the calling device. Operation of the SENSE_CONFIGURATION function begins at step 800 wherein it is called. Control transfers to step 802 wherein signature address, compatibility port address, operating system, interleave factor, drive count, physical drive count, tolerance mode and other physical logical parameters are loaded into a data structure in the local memory by the local processor 122. Control transfers to step 804 wherein the local processor 122 roads the RIS data structures for all drives specified in the drive man into local memory. Control transfers to step 806 in which the local processor 122 transfers the data structure from local memory into the transfer buffer. Control transfers to step 808 where the local processor 122 transfers drive array information to the host memory. Control transfers to step 810, where the local processor determines whether there exists a second scatter/gather count field for the particular configuration. If there is no second scatter/gather count, control transfers to step 814 wherein control returns to the local processor 122 operating system. If there is a second scatter/gather count, control transfers to step 812 in which the local processor 122 transfers the second scatter/gather count from the transfer buffer to the host or calling device memory.

18. BMIC Sense Scatter/Gather Structure

Figure 27:
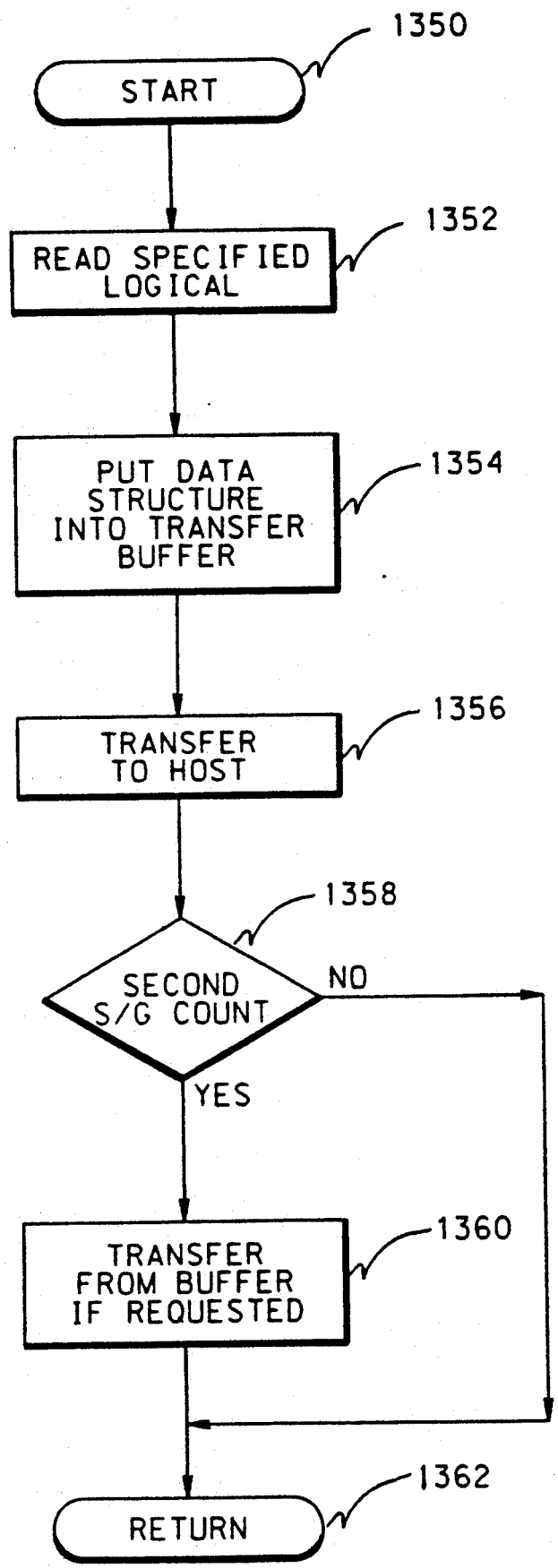
FIG. 27 is flow diagram of the manner in which the present invention determines specific unit information for a unit within the disk drive.

FIG. 27 is a flow diagram of the BMIC_SENSE_UNIT function which is used to read parameters dealing with a specific drive within the disk array. BMIC_SENSE_UNIT is called in step 1350. Control transfers to step 1352 where the local processor 122 allocates local memory and reads the specified logical drive data into the local memory. Control transfers to step 1354 where the local processor 122 transfers the data structure into the transfer buffer. Control transfers to step 1356 where the local processor 122 transfers the unit data to the host using SG_BLOCK. Control transfers to step 1358 in which the local processor 122 determines if there is a second S/G count field in the request header. If there is no second S/G count header, control transfers to step 1362. If there is an additional S/G count header, control transfers to step 1360 where the local processor 122 calls the SG_BLOCK function to transfer the data from the transfer buffer to the host. Control transfers to step 1362 which terminates operation of the BMIC_SENSE_UNIT function and returns control to the local processor operating system.

19. Identify Controller or Disk

Figure 16:
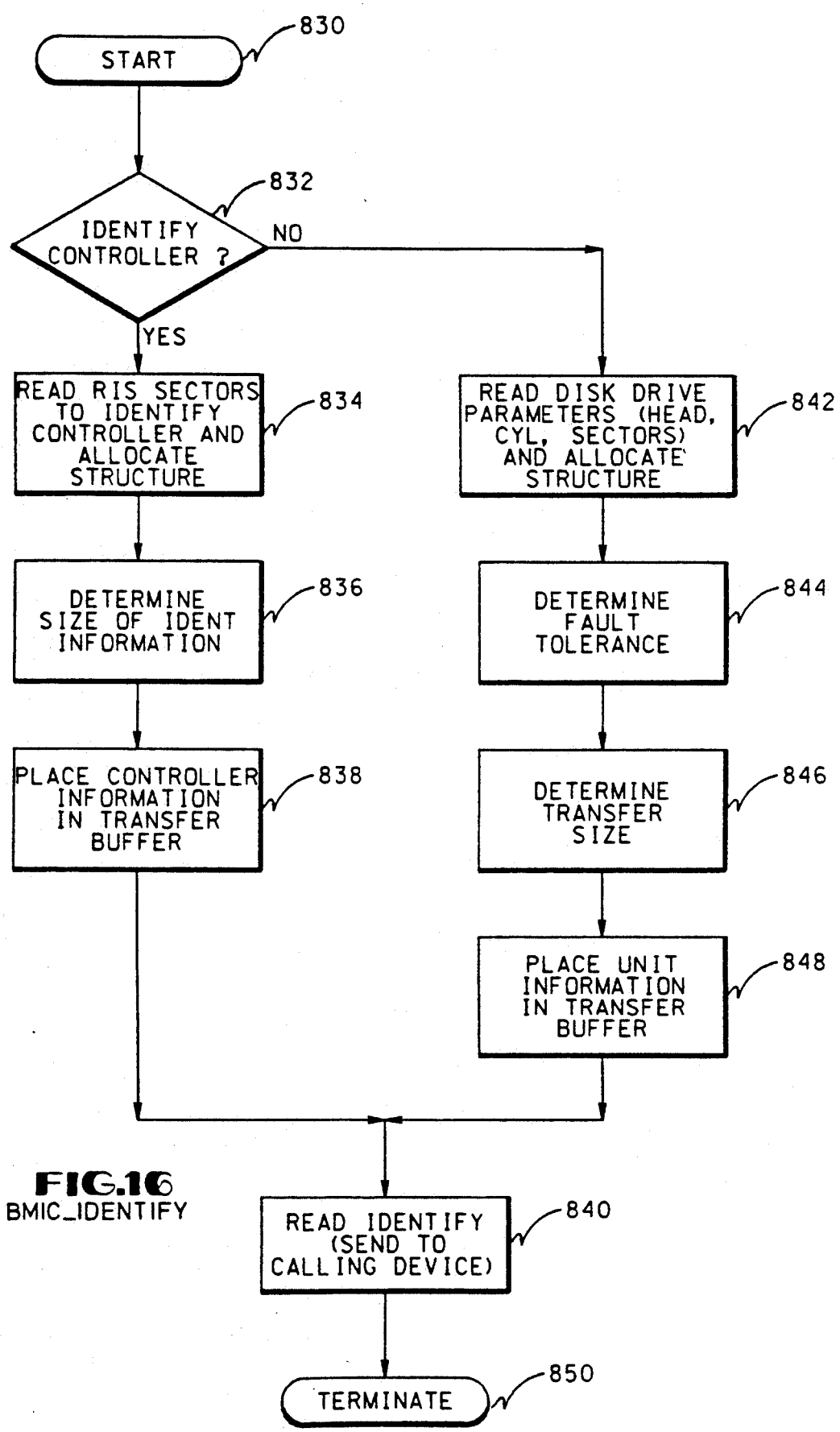
FIG. 16 is a flow diagram of the manner in which the present invention processes a command to identify individual disk or disk array controllers.

FIG. 16 is a flow diagram of the BMIC IDENTIFY function of the present invention. The function is called at step 830 and control transfers to step 832 in which the local processor 122 determines whether the command was an identify controller or identify drive command. If it is identify controller, control transfers to step 834. In step 834, the local processor 122 allocates local memory for a data structure for the RIS sectors of the disks, and reads the RIS sector information into the structure. Control transfers to step 836 in which the local processor 122 determines the size of the identification information to be sent to the calling device. Control transfers to step 838 in which the local processor 122 loads the controller information in the transfer buffer. Control transfers 840. If in step 832 it is determined that the identify command is requesting identification information for a particular drive, control transfers to step 842, wherein the local processor 122 allocates local memory for the data structure and reads the disk drive parameters including head, cylinder and number of sectors per cylinder. Control transfers to step 844 in which the local processor 122 determines the type of fault tolerance for the particular drives. Control transfers to step 846 where the local processor 122 determines the size of the transfer information to be sent to the calling device. This transfer size information is then added to the command header. Control transfers to step 848 wherein the local processor 122 loads the unit information for the disks is to the transfer buffer. Control transfers to step 840, wherein the local processor 122 sends the identification information to the calling device. Control transfers to step 850, wherein operation of the BMIC_IDENTIFY function terminates and control is returned to the local processor operating system.

20. Logical Unit Configuration Check

Figure 23:
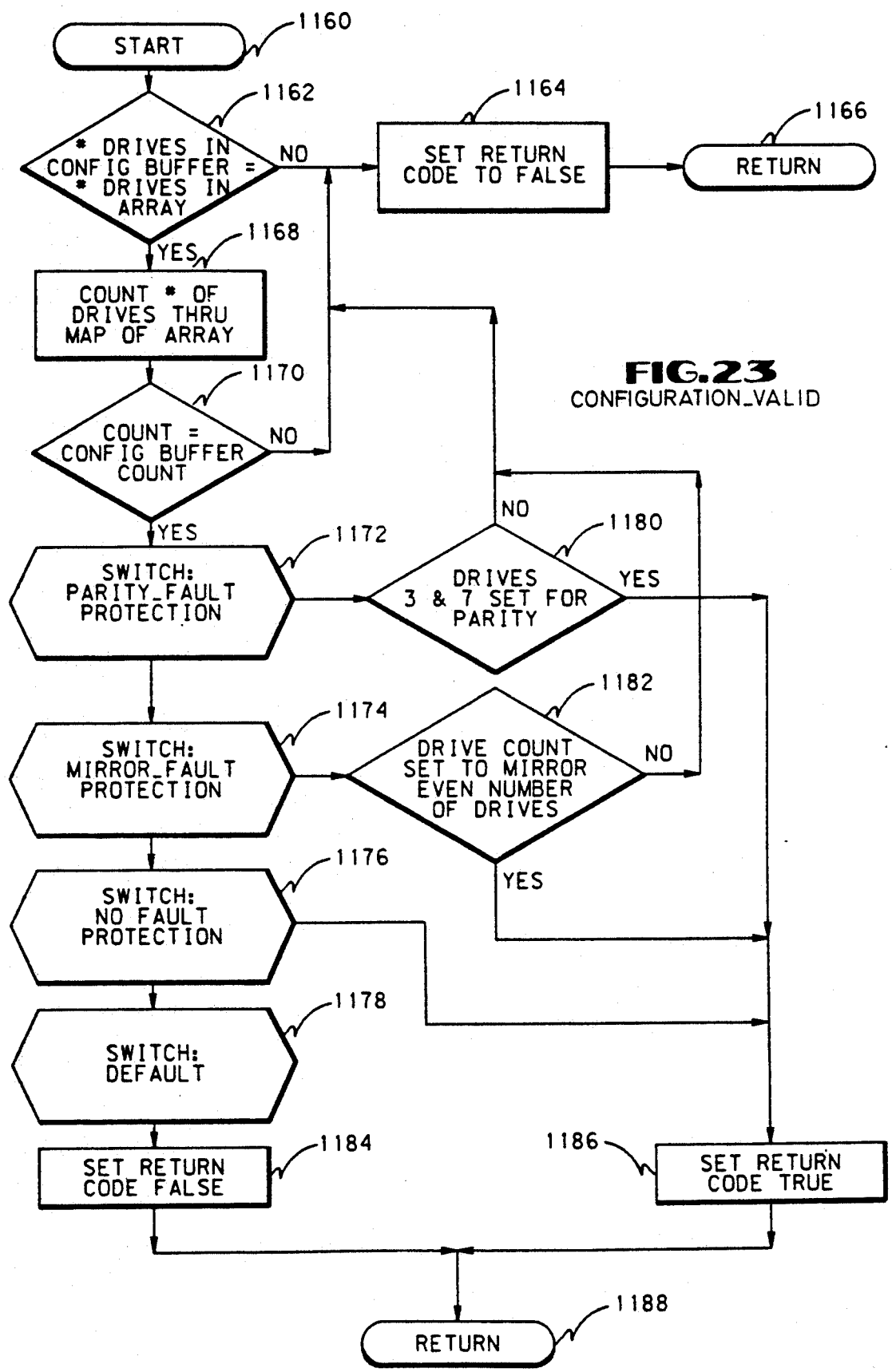
FIG. 23 is a flow diagram of the manner in which the present invention determines whether a disk array configuration is valid.

FIG. 23 is a flow diagram of the CONFIGURATION_VALID function which may be called by other tasks in the present invention. CONFIGURATION_VALID is called in step 1160. Control transfers to step 1162 where the local processor 122 determines whether the number of drives in the configuration buffer is equal to the physical number of drives in the logical unit. If the physical number of drives in the array are not equal to the number drives in the configuration buffer, control transfers to step 1164 in which the local processor 122 sets a return code of FALSE and transfers control to step 1166 which returns to the calling program. If the number of drives in the configuration buffer is equal to the physical number of drives in the logical unit, control transfers to step 1168 where the local processor 122 counts the number of drives through the map of the logical unit. Control transfers to step 1170 where the local processor 122 determines whether the count as obtained through the map of the logical unit is equal to the number of disk specified in the configuration buffer count. If they are not equal control transfers to step 1164 in which the local processor 122 sets a return code of FALSE and returns to the calling program in step 1166. If the count is equal to the configuration buffer count, control transfers to steps 1172-1178 which comprise a switch, based on fault tolerance modes in the logical unit. In step 1172 if the disk array is set for PARITY_FAULT_PROTECTION, control is then transferred to step 1180 in which the local processor 122 determines whether drives 3 and 7 are set for parity. If drives 3 and 7 are not set for parity, control transfers to step 1164 in which the local processor 122 sets a return code of FALSE and returns to the calling program in step 1166. If drives 3 and 7 are set for parity, control transfers to step 1186 in which the local processor 122 sets a return code of TRUE. If step 1174 determines that the configuration calls for MIRROR_FAULT protection, control is transferred to step 1182 in which the local processor 122 determines whether the user drive count has been set for mirror, i.e., drives 0-3 are the only active user drives. If the drive count has been set to reflect MIRROR_FAULT protection, control transfers to step 1186 in which the local processor 122 sets a return code of TRUE. If the drive count has not been set to reflect MIRROR_FAULT protection, control transfers to step 1164 in which the local processor 122 sets a return code of FALSE and returns to the calling program in step 1166. If step 1176 determines there is no fault protection in the disk array, control transfers to step 1186 in which the local processor 122 sets a return code of TRUE. If step 1178 determines that a field is blank or default, control transfers to step 1184 in which the local processor 122 sets a return code of FALSE. Control transfers to step 1188 which returns to the calling program. In step 1186 the local processor 122 sets a return code of TRUE and control transfers to step 1188 which returns to the calling program.

VI. Conclusion

It will be appreciated that the protocol defined in the present invention will result in improved host processor efficiency. The host processor need not issue disk specific commands to the drive array. The building of the disk specific commands has been off-loaded to the local processor within the disk array controller. Further, the system processor need only issue logical level commands to the disk array controller.

Further, the use of a bus master interface controller relieves the system processor from data transfer management tasks as the I/O operations are carried out. The transfer of these tasks to the disk array controller will result in improved overall performance for the computer system.

We claim:

1. A method for managing the transfer of data between a host computer, the host computer including a housing, a host processor, a host bus and host memory, an input/output bus and a disk array, the disk array being in communication with the host bus and including a plurality of physical disk drives organized as a logical disk drive, a microprocessor-based disk array controller and memory, the disk array controller and memory being on a single circuit board connected to the input/output bus, the method comprising the steps of:

the host computer generating a logical disk access request, said logical disk access request being stored in the host memory at a host memory address;

the host computer notifying the disk array controller of the existence and address of said logical disk access request;

the disk array controller retrieving said logical disk access request from the host computer memory;

the disk array controller translating said logical disk access request into at least one disk specific command to access one or more disk drives within the disk array independent of the host computer;

the disk array controller processing said disk specific command;

the disk array controller managing the transfer of data between the disk array and the host computer; and the disk array controller notifying the host computer when said logical disk access request has completed.

2. The method of claim 1, wherein the step of the host computer generating a logical disk access request further includes the step of the host computer generating a command list corresponding to said logical disk access request, said command list including at least one disk access command.

3. The method of claim 2, wherein the step of the host computer generating a command list further includes the step of the host computer specifying a logical disk array address, command completion information, command priority information, host memory address and size for each disk access command within the command list.

4. The method of claim 3, wherein the step of the disk array controller translating said logical disk access request into disk specific commands includes the steps of:

the disk array controller reading said command list;

the disk array controller generating at least one disk specific command, said disk specific command including command function and disk seek information.

5. The method of claim 4, wherein the step of the disk array controller processing said disk specific commands includes the steps of:

the disk array processor queuing said disk specific commands based on said command priority information specified in said command list; and the disk array controller transferring said disk specific commands to individual disk drives within the disk array for execution.

6. The method of claim 1, wherein the step of the disk array controller managing the transfer of data between the disk array and the host computer further includes the steps of:

the disk array controller asserting control over the host computer bus;

the disk array controller determining the a data width size for the data transfer;

the disk array controller transferring data to or from the host computer memory; and the disk array controller relinquishing control of the host computer bus.

7. The method of claim 6, wherein the step of the disk array controller managing the transfer of data to or from the host computer includes transferring 32 bit wide data.

8. The method of claim 7, wherein the step of the disk array controller managing the transfer of 32 bit wide data to or from the host computer includes transferring said 32 bit wide data at the rate of 33 Mbytes per second.

9. The method of claim 6, wherein the step of the disk array controller managing the transfer of data to the host computer includes transferring 32 bit wide data to a device attached to the host computer capable of receiving 8 bit or 16 bit wide data.

10. The method of claim 1, wherein the step of the disk array controller notifying the host computer when said logical disk access request has completed includes the step of the disk array controller writing completion information to a host computer mailbox register.

11. The method of claim 1, wherein the step of the host computer notifying the disk array controller of the existence and address of said logical disk access request includes the host computer writing to a mailbox register in the disk array controller memory.

* * * * *